United States Patent
Choi et al.

(10) Patent No.: US 11,184,098 B2
(45) Date of Patent: Nov. 23, 2021

(54) METHOD FOR CONTROLLING INTER-CELL INTERFERENCE IN WIRELESS COMMUNICATION SYSTEM, AND DEVICE THEREFOR

(71) Applicant: LG ELECTRONICS INC., Seoul (KR)

(72) Inventors: Kukheon Choi, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 16/496,391

(22) PCT Filed: Mar. 22, 2017

(86) PCT No.: PCT/KR2017/003068
§ 371 (c)(1),
(2) Date: Sep. 20, 2019

(87) PCT Pub. No.: WO2018/174312
PCT Pub. Date: Sep. 27, 2018

(65) Prior Publication Data
US 2021/0111823 A1    Apr. 15, 2021

(51) Int. Cl.
*H04L 5/00* (2006.01)
*H04J 11/00* (2006.01)
(Continued)

(52) U.S. Cl.
CPC .......... *H04J 11/005* (2013.01); *H04B 17/345* (2015.01); *H04L 5/0048* (2013.01); *H04J 2211/005* (2013.01)

(58) Field of Classification Search
CPC . H04J 11/005; H04J 2211/005; H04L 5/0048; H04B 17/345
See application file for complete search history.

(56) References Cited

U.S. PATENT DOCUMENTS

| 2014/0211735 A1* | 7/2014 | Nanri ........................ H04L 1/20 370/329 |
| 2015/0189666 A1 | 7/2015 | Wang et al. |

(Continued)

FOREIGN PATENT DOCUMENTS

| CN | 104301923 | 1/2015 |
| CN | 105409146 | 3/2016 |

(Continued)

OTHER PUBLICATIONS

Huawei et al., "UL SRS design for CSI acquisition and beam management," 3GPP TSG RAN WG1 Meeting #88, R1-1701699, Feb. 2017, 8 pages, Line-numbered (Year: 2017).*

(Continued)

*Primary Examiner* — Moo Jeong
(74) *Attorney, Agent, or Firm* — Lee, Hong, Degerman, Kang & Waimey

(57) ABSTRACT

A method for a base station to control inter-cell interference in a wireless communication system comprises: a step in which a base station receives, in a predefined physical resource region, a demodulation reference signal (DMRS) or a sounding reference symbol (SRS) from a terminal in a cell to which the base station belongs; a step of measuring interference in a resource on which the DMRS or the SRS has been transmitted, on the basis of an interference measurement method corresponding to the predefined physical resource region; and a step of determining the terminal as a victim terminal associated with the predefined physical resource region, if the intensity of the interference measured is greater than a predetermined threshold, wherein the predefined physical resource region may be a first physical resource region for an uplink data transmission in the cell to which the base station belongs, or a second physical resource region for uplink beam sweeping in the cell to which the base station belongs, the first and second physical (Continued)

resource regions corresponding to a physical resource region for uplink beam sweeping in a neighboring cell to which a neighboring base station belongs.

16 Claims, 30 Drawing Sheets

(51) Int. Cl.
*H04B 17/345* (2015.01)
*H04B 7/08* (2006.01)
*H04B 7/06* (2006.01)

(56) References Cited

U.S. PATENT DOCUMENTS

2018/0242327 A1* 8/2018 Frenne ............... H04W 72/042
2020/0186312 A1* 6/2020 Mochizuki ........ H04W 72/0413

FOREIGN PATENT DOCUMENTS

| | | |
|---|---|---|
| CN | 105940624 | 9/2016 |
| EP | 2680639 | 1/2014 |
| JP | 2015159421 | 9/2015 |
| KR | 1020120024497 | 3/2012 |
| KR | 1020150066841 | 6/2015 |
| KR | 1020160043300 | 4/2016 |
| WO | 2016153204 | 9/2016 |
| WO | 2017027055 | 2/2017 |

OTHER PUBLICATIONS

PCT International Application No. PCT/KR2017/003068, Written Opinion of the International Searching Authority dated Dec. 19, 2017, 21 pages.
European Patent Office Application Serial No. 17902528.3, Search Report dated Nov. 17, 2020, 13 pages.
The State Intellectual Property Office of the People's Republic of China Application Serial No. 201780088817.0, Office Action dated Dec. 24, 2020, 8 pages.
Samsung, "NR-SRS design for UL beam management," 3GPP TSG RAN WG1 Meeting #88, R1-1702940, Feb. 2017, 4 pages.
Qualcomm Incorporated, "Views on SRS," 3GPP TSG-RAN WG1 Meeting #87, R1-1612049, Nov. 2016, 4 pages.
Nokia et al., "UL SRS design considerations in NR," 3GPP TSG RAN WG1 Meeting #88, R1-1703183, Feb. 2017, 6 pages.
LG Electronics, "Considerations on NR SRS design," 3GPP TSG RAN WG1 Meeting #88, R1-1702465, Feb. 2017, 4 pages.
Huawei et al., "UL SRS design for CSI acquisition and beam management," 3GPP TSG RAN WG1 Meeting #88, R1-1701699, Feb. 2017, 8 pages.
AT&T, "Design of Interference Measurement for NR," 3GPP TSG RAN WG1 Meeting #88, R1-1702296, Feb. 2017, 7 pages.
Japan Patent Office Application Serial No. 2019-551939, Office Action dated Jun. 1, 2021, 5 pages.

* cited by examiner

FIG. 8
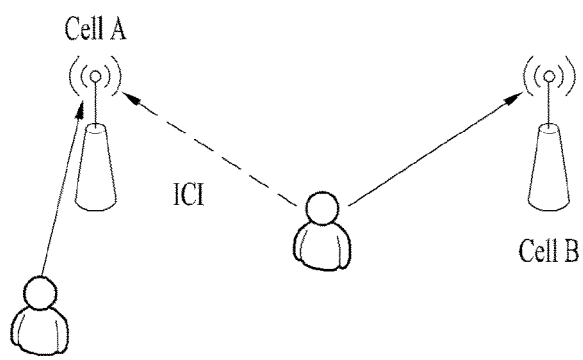
(a) UL ICI between different numerologies
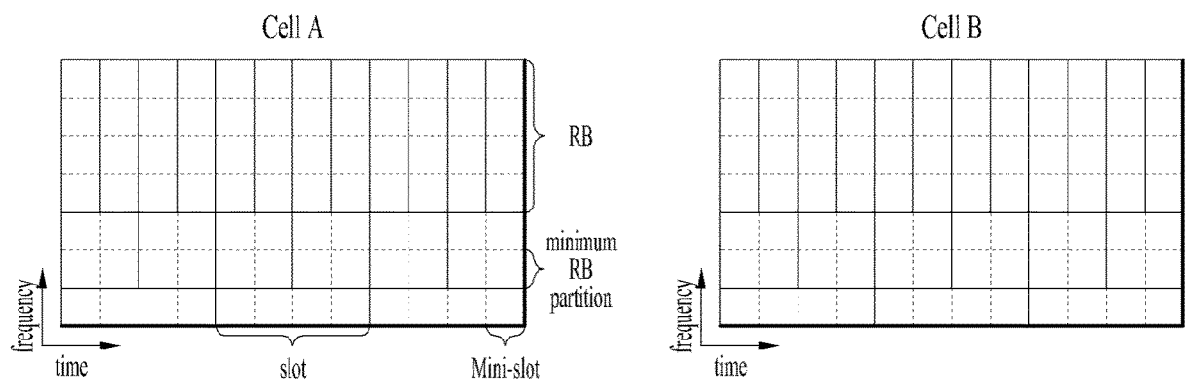
(b) Different configurations of multiple numerologies of cells

FIG. 12
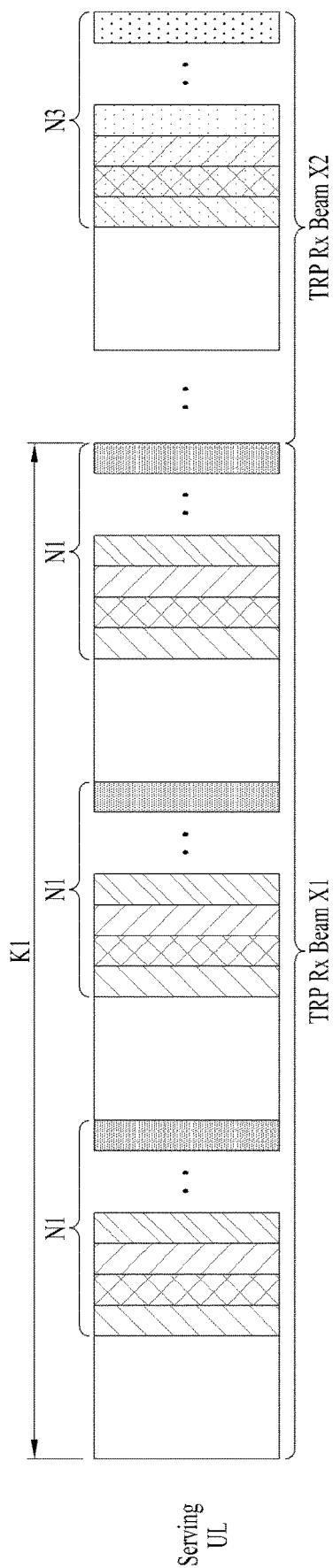
(a) Case in which order of beam pairs for multiple SRS transmission is same
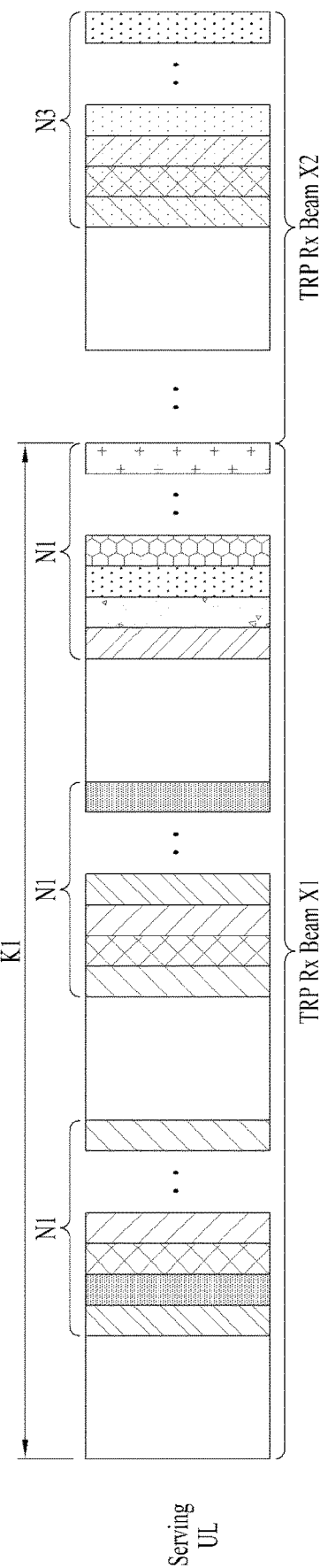
(b) Case in which order of beam pairs for multiple SRS transmission is different

FIG. 13
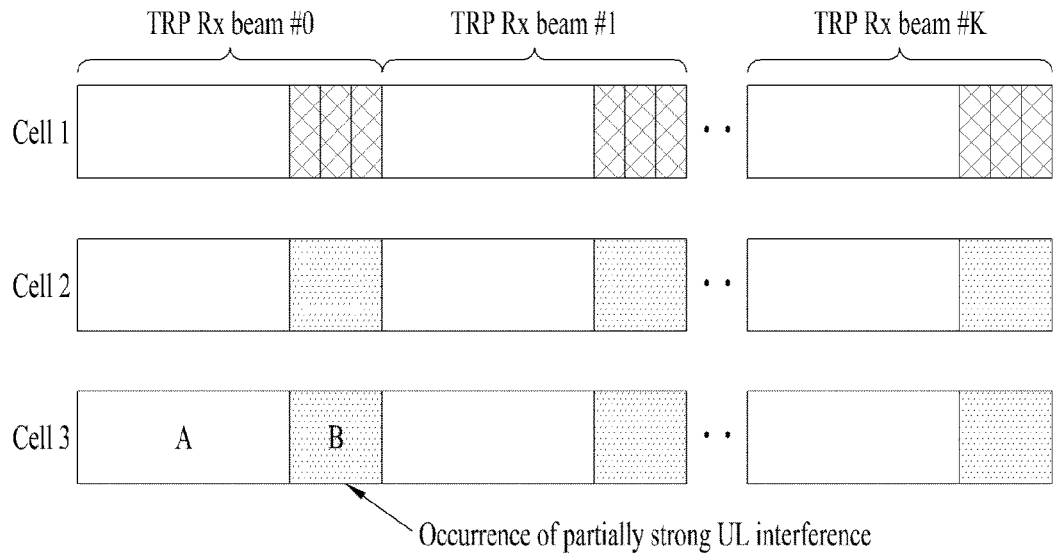
(a) Region segmentation according to interference variation between cells (regions A and B)
Occurrence of partially strong UL interference
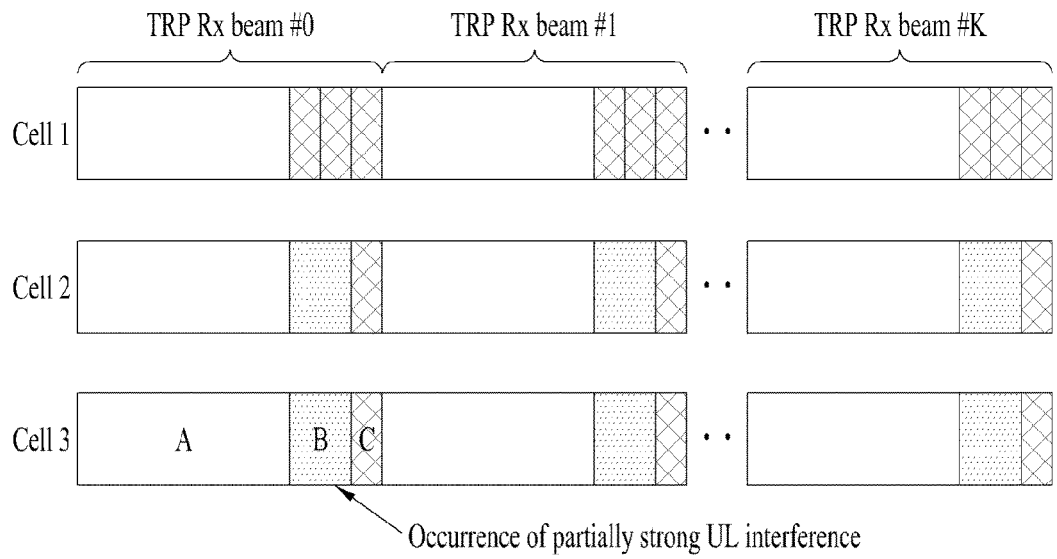
(b) Region segmentation according to interference variation during
UL beam sweeping of neighboring cells (regions A, B, and C)

FIG. 14
Periodic reporting (reported in subframe n+3 according to set associated with each type)
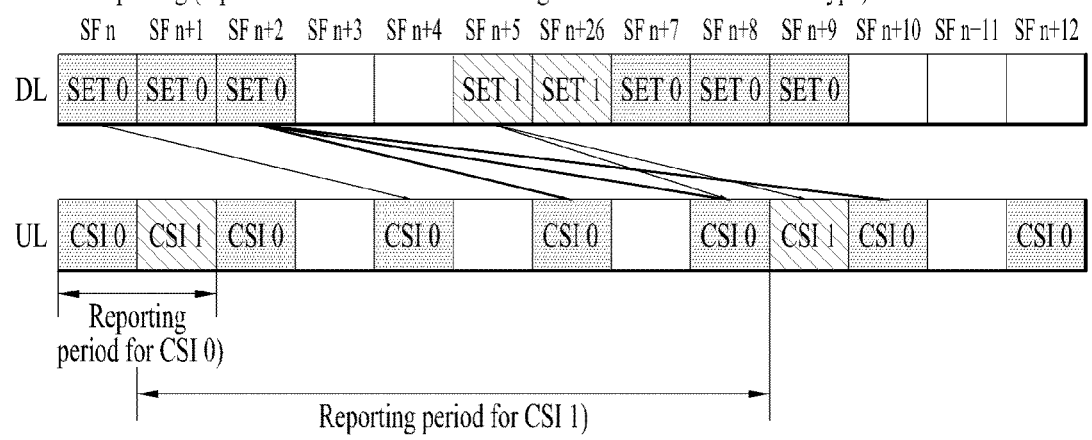
(a)
Aperiodic report (based on DL triggering)
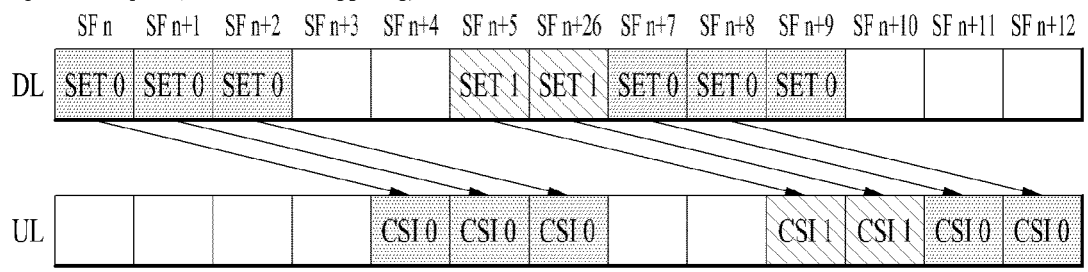
(b)

FIG. 15
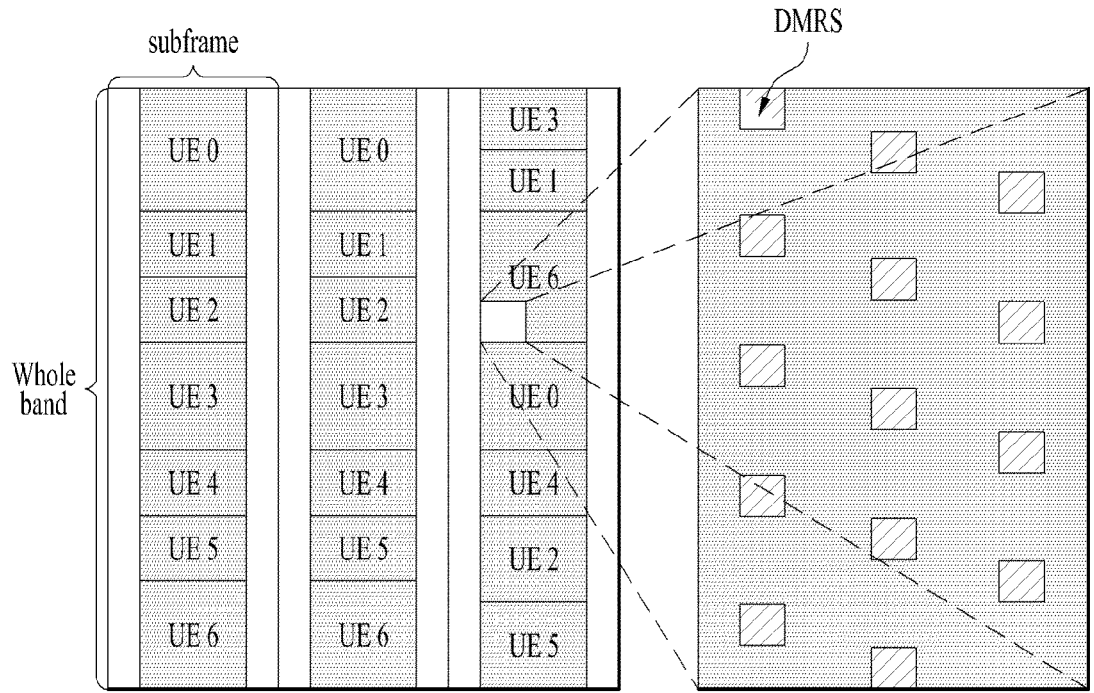
(a) Basic UL transmissions structure
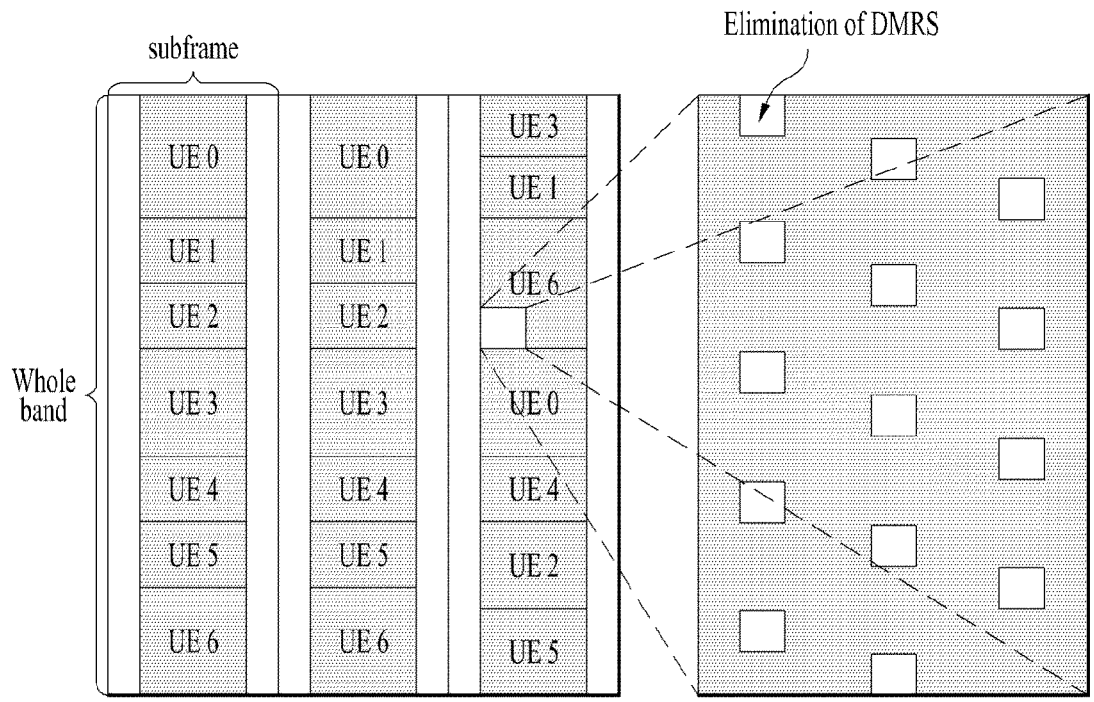
(b) Elimination of DMRS reception by eNB through legacy DMRS information Elimination of DMRS DMRS region for interference measurement of same beam pair (Type d-1)

DMRS region for interference measurement of same TRP Rx beam (Type d-2)

METHOD FOR CONTROLLING INTER-CELL INTERFERENCE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/003068, filed on Mar. 22, 2017, the contents of which are all hereby incorporated by reference herein in their entirety.

TECHNICAL FIELD

The present invention relates to wireless communication and, more particularly, to a method of controlling inter-cell interference in a wireless communication system and an apparatus therefor.

BACKGROUND

With the introduction of a new radio access technology (RAT) system, as more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE OF THE INVENTION

Technical Task

An object of the present invention is to provide a method of controlling inter-cell interference by a base station in a wireless communication system.

Another object of the present invention is to provide a base station for controlling inter-cell interference in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present invention, provided herein is a method of controlling inter-cell interference by a base station (BS) in a wireless communication system, including receiving a demodulation reference signal (DMRS) or a sounding reference symbol (SRS) from a user equipment (UE) of a cell to which the BS belongs in a predefined physical resource region; measuring interference on a resource on which the DMRS or the SRS is transmitted based on an interference measurement scheme corresponding to the predefined physical resource region; and when the strength of the measured interference is greater than a predetermined threshold, determining the UE as a victim UE for the predefined physical resource region. The predefined physical resource region may be a first physical resource region for uplink data transmission of a cell to which the BS belongs, corresponding to a physical resource region for uplink beam sweeping of a neighboring cell to which a neighboring BS belongs, or a second physical resource region for the UL beam sweeping of the cell to which the BS belongs.

The resource on which the SRS or the DMRS is transmitted may include a time duration of one symbol of the second physical resource region in a time domain and interference may be measured in the time duration of the one symbol.

The resource on which the SRS is transmitted may include a time duration corresponding to one transmission (Tx) beam identifier (ID) of the UE for transmitting the SRS in a time domain of the second physical resource region and interference may be measured in the time duration corresponding to the one Tx barn ID of the UE.

The resource on which the SRS is transmitted may include a time duration corresponding to one transmission reception point (TRP) reception (Rx) beam identifier (ID) in a time domain of the second physical resource region and interference may be measured in the time duration corresponding to the TRP Rx beam.

The resource on which the SRS is transmitted may include a time duration for uplink beam refinement of the UE in a time domain of the second physical resource region and interference may be measured in the time duration for the uplink beam refinement.

The resource on which the DMRS is transmitted may be a symbol unit in a time domain of the first physical resource region and interference may be measured in the symbol unit in which the DMRS is transmitted.

The resource on which the DMRS is transmitted may include a time duration corresponding to one TRP reception (Rx) beam identifier (ID) in a time domain of the first physical resource region and interference may be measured in the time duration corresponding to the one TRP Rx beam ID.

The method may further include transmitting information about an almost blank resource allocated based on the interference measurement to the determined victim UE.

In another aspect of the present invention, provided herein is a base station (BS) for controlling inter-cell interference in a wireless communication system, including a receiver configured to receive a demodulation reference signal (DMRS) or a sounding reference symbol (SRS) from a user equipment (UE) of a cell to which the BS belongs in a predefined physical resource region; and a processor configured to measure interference on a resource on which the DMRS or the SRS is transmitted based on an interference measurement scheme corresponding to the predefined physical resource region, and determine the UE as a victim UE for the predefined physical resource region when the strength of the measured interference is greater than a predetermined threshold. The predefined physical resource region may be a first physical resource region for uplink data transmission of a cell to which the BS belongs, corresponding to a physical resource region for uplink beam sweeping of a neighboring cell to which a neighboring BS belongs, or a second physical resource region for the UL beam sweeping of the cell to which the BS belongs.

The resource on which the SRS or the DMRS is transmitted may include a time duration of one symbol of the second physical resource region in a time domain and the processor may be configured to measure interference in the time duration of the one symbol.

The resource on which the SRS is transmitted may include a time duration corresponding to one transmission (Tx) beam identifier (ID) of the UE in a time domain of the second physical resource region and the processor may be configured to measure interference in the time duration corresponding to the one Tx bam ID of the UE.

The resource on which the SRS is transmitted may include a time duration corresponding to one transmission reception point (TRP) reception (Rx) beam identifier (ID) in a time domain of the second physical resource region and the processor may be configured to measure interference in the time duration corresponding to the TRP Rx beam.

The resource on which the SRS is transmitted may include a time duration for uplink beam refinement of the UE in a time domain of the second physical resource region and the processor may be configured to measure interference in the time duration for the uplink beam refinement.

The resource on which the DMRS is transmitted may be a symbol unit in a time domain of the first physical resource region and the processor may be configured to measure interference in the symbol unit in which the DMRS is transmitted.

The resource on which the DMRS is transmitted may include a time duration corresponding to one TRP reception (Rx) beam identifier (ID) in a time domain of the first physical resource region and the processor may be configured to measure interference in the time duration corresponding to the one TRP Rx beam ID.

The BS may further include a transmitter configured to transmit information about an almost blank resource allocated based on the interference measurement to the determined victim UE.

Advantageous Effects

According to an embodiment of the present invention, resources are efficiently allocated by relieving inter-cell interference in a New RAT structure, to thereby improve the performance of a communication system.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 8 is a diagram illustrating an interference problem according to a configuration of multiple different numerologies, in which (a) illustrates a UL inter-cell interference (ICI) between different numerologies and (b) illustrates different configurations of multiple numerologies of cells.

FIG. 12 is a diagram illustrating an interference relationship according to a beam pair order for multiple SRS transmission.

FIG. 13 is a diagram illustrating segmentation of a resource region according to an ICI level.

FIG. 14 is a diagram illustrating a CSI reporting method.

FIG. 15 is a diagram illustrating UL transmission of UEs and deployment of DMRSs.

MODE FOR INVENTION

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present disclosure. And, the use of the specific terminology can be modified into another form within the scope of the technical idea of the present disclosure.

Figure 1:
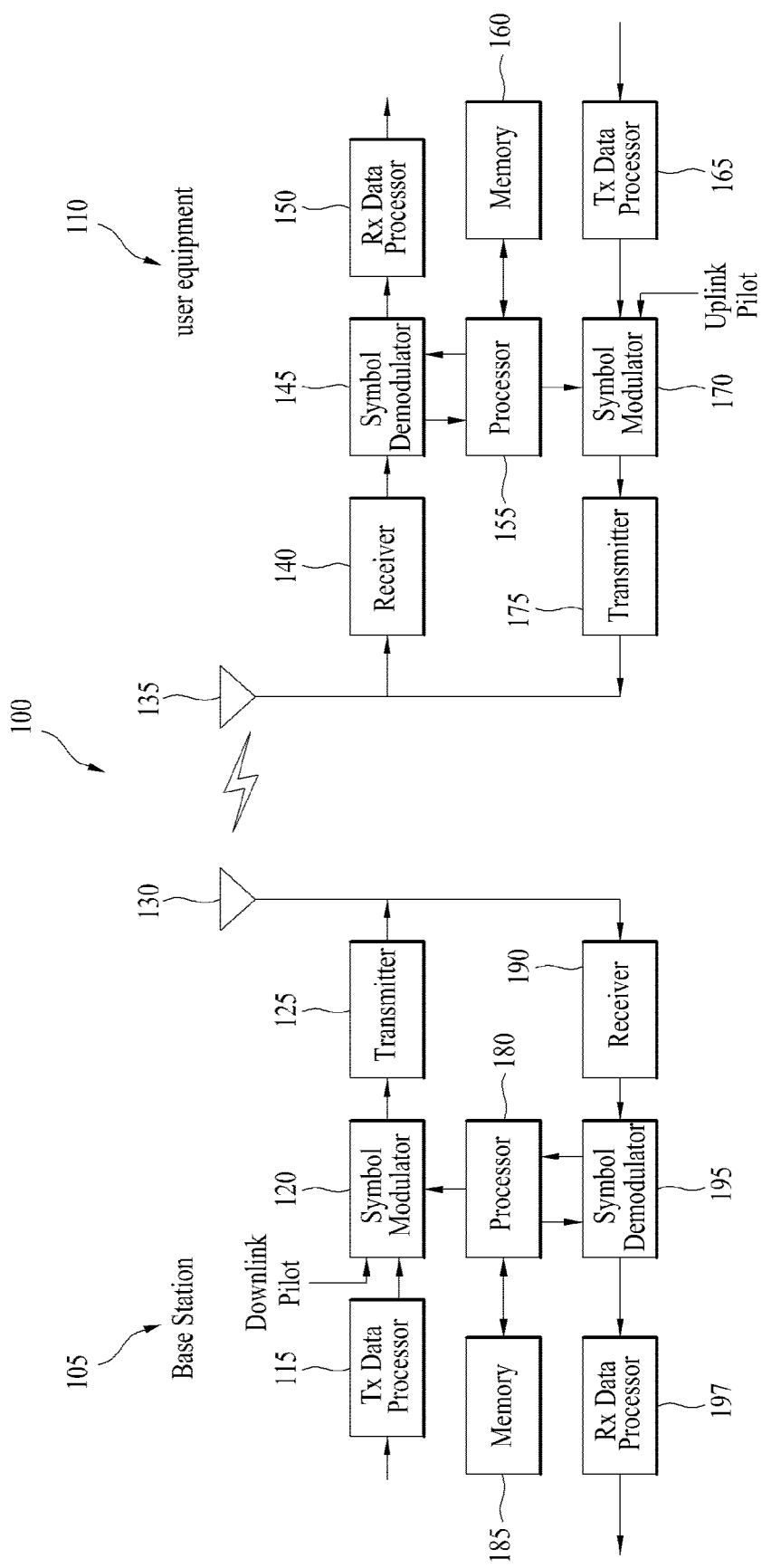
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted toward many beam directions (in accordance with a UE's Tx beam set for all directions), it may result in significant resource waste. Accordingly, the present disclosure proposes a method of performing an adaptive UE Tx beam tracking by performing SRS transmission flexibly according to UE pattern changes.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell.
The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframe Assignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when K is even} \\ n_{SRS} \bmod 2 & \text{when K is odd} \end{cases},$$

$$\beta = \begin{cases} 1 & \text{where K mod } 4 = 0 \\ 0 & \text{otherwise} \end{cases}$$

when frequency hopping is enabled (i.e. $b_{hop} < B_{SRS}$), where values $B_{SRS}$, $b_{hop}$, $N_b$, and $n_{SRS}$ are given in subclause 5.5.3.2 of [3], and $$K = \prod_{b'=b_{hop}}^{B_{SRS}} N_{b'}$$

(where $N_{b_{hop}} = 1$ regardless of the $N_b$ value), except when a single SRS transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 $N_p \in \{0,1,2,4\}$ and for PUSCH transmission mode 2 $N_p \in \{0,1,2\}$ with two antenna ports configured for PUSCH and $N_p \in \{0,1,4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell, TABLE 3-continued The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes.
For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$,, where for FDD $k_{SRS} = \{0, 1, , , , 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.

TABLE 3-continued

Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying n + k, k ≥ 4 and $(10 \cdot n_f + k_{SRS} - T_{offset,1}) \bmod T_{SRS,1} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS subframeOffset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows $k_{SRS}$ for TDD.

TABLE 7

| | | | | subframe index n | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | | 0 | 1 | 2 | 3 | 4 | | 5 | 6 | 7 | 8 | 9 |
| $k_{SRS}$ in case UpPTS length of 1 symbol | | | 1 | 2 | 3 | 4 | | | 6 | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS subframe Offset |
| --- | --- | --- |
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS subframe Offset |
| --- | --- | --- |
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Figure 2:
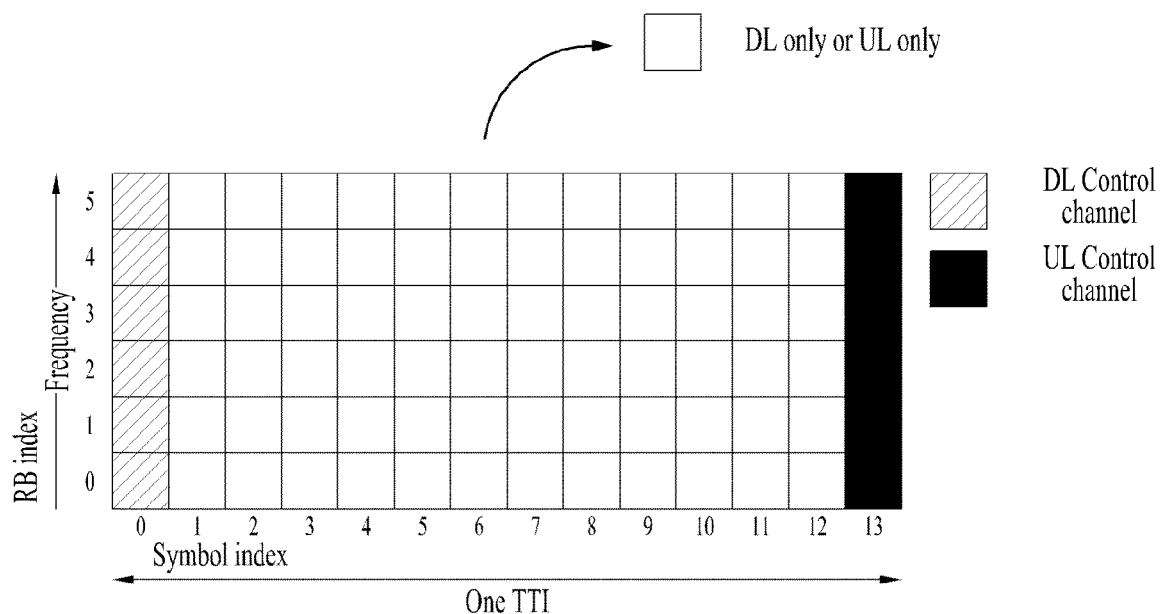
FIG. 2 is a diagram illustrating the structure of a subframe where TDM is applied to data and control channels.

FIG. 2 is a diagram illustrating the structure of a subframe where TDM is applied to data and control channels.

Specifically, FIG. 2 shows that TDM is applied to data and control channels in one subframe. In FIG. 2, the hatched area represents a Downlink (DL) control region (i.e., a resource region in which a DL control channel is transmitted), and the black area represents an Uplink (UL) control region (i.e., a resource region in which a UL control channel is transmitted). The unmarked area in the subframe of FIG. 2 can be used for DL or UL data transmission. According to this structure, it is possible to transmit DL data and receive UL ACK/NACK in a single subframe since DL transmission and UL transmission are sequentially performed in the single subframe. Consequently, when a data transmission error occurs, it is possible to reduce a time required until data is retransmitted, thereby minimizing the latency of the overall data transmission.

In the above subframe structure where the data and control channels are Time Division Multiplexed (TDMed), a time gap is required to allow a BS and a UE to switch from transmission mode to reception mode or vice versa. To this end, some Orthogonal Frequency Division Multiplexing (OFDM) symbols at the DL-to-UL switching time can be configured as a Guard Period (GP) in this subframe structure.

In FIG. 2, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration that the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 2, the unmarked area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

In the new RAT system, the following four subframe types may be considered as examples of configurable self-contained subframe types. In the four subframe types, individual regions are arranged within a subframe in time order.

1) DL control region+DL data region+GP+UL control region

2) DL control region+DL data region

3) DL control region+GP+UL data region+UL control region

4) DL control region+GP+UL data region

Among requirements of a New RAT system, an especially important part will be an environment in which plural services requiring different measurement requirements or transmission of different control information simultaneously coexist.

In New RAT, since various numerologies/services coexist, various structures of UL channels coexist, and UL beam sweeping, which has not existed in a legacy environment, is configured, it is expected that variations in UL channels and measurement will greatly occur. Therefore, since variations in ICI may also variously appear and a legacy measurement and reporting method is not sufficient to acquire and determine information about ICI which will variously occur, it is necessary to consider an interference measurement and reporting method suitable for a New RAT environment. The present invention proposes a resource allocation method for measurement to relieve UL ICI in a New RAT structure.

Figure 3:
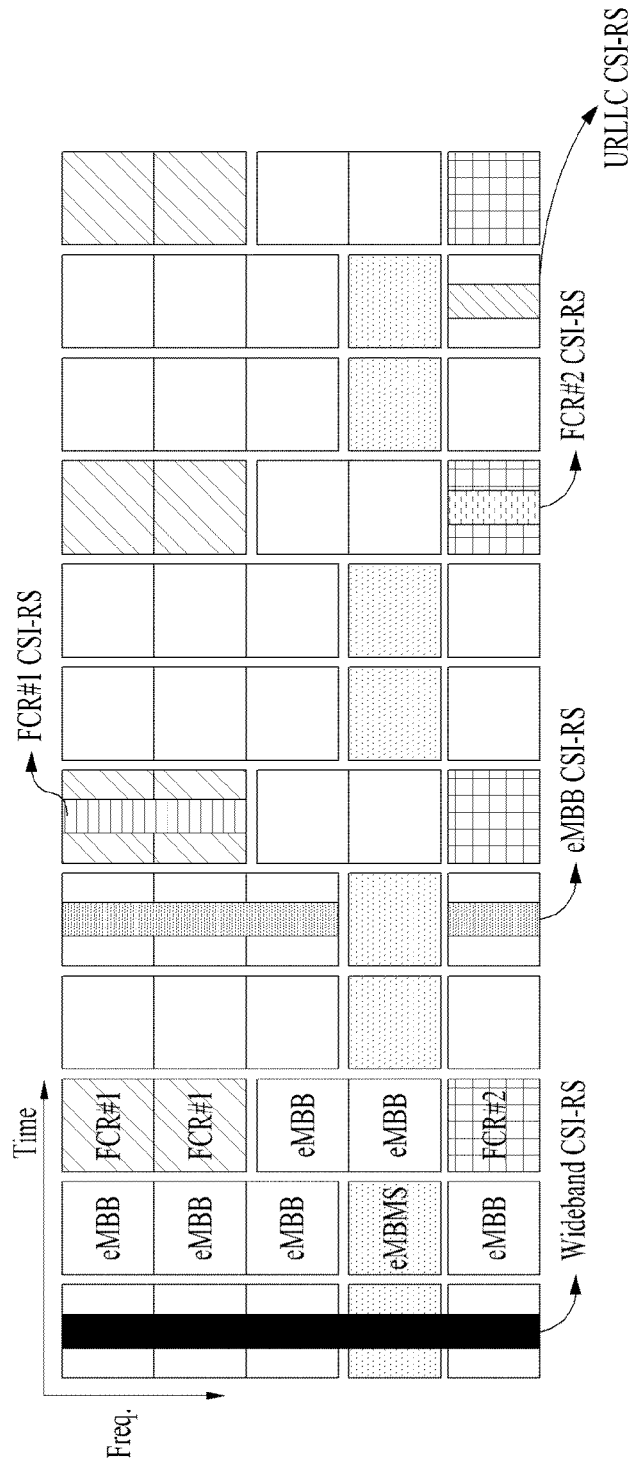
FIG. 3 is a diagram illustrating the (wideband or subband) structure of a hybrid channel state information reference signal (CSI-RS) for supporting various services in New RAT.

FIG. 3 is a diagram illustrating the (wideband or sub-band) structure of a hybrid channel state information reference signal (CSI-RS) for supporting various services in New RAT.

As illustrated in FIG. 3, in order to simultaneously support various services of New RAT, it is necessary to form heterogeneous CSI-RSs with a wideband or sub-band structure from the viewpoint of DL. Therefore, if the structure of FIG. 3 is regarded as one of the requirements of New RAT, a UL resource is also likely to be a type corresponding to this structure.

Figure 4:
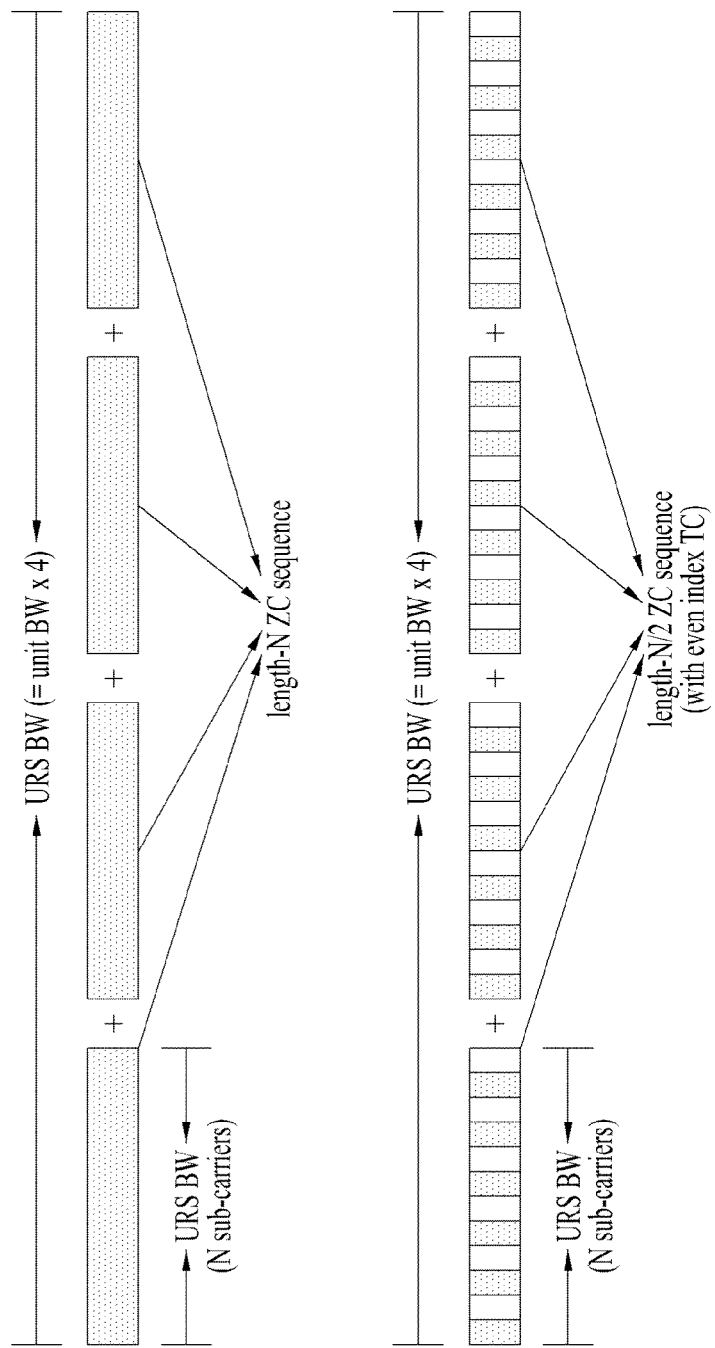
FIG. 4 is a diagram illustrating definition and deployment (including transmission combs) of a localized UL RS (URS) unit bandwidth (BW).

FIG. 4 is a diagram illustrating definition and deployment (including transmission combs) of a localized UL RS (URS) unit bandwidth (BW).

In particular, in the structure of a UL SRS (this may be referred to as an xSRS in New RAT), localized or distributed type transmission in one symbol, as well as whole band transmission of a UE, according to different service requirements, may be performed. In this structure, the SRS needs to consider a structure in which the SRS is multiplexed with another UL channel (e.g., a UL control channel), for efficient resource allocation.

As illustrated in FIG. 4, it may be appreciated that a whole band is divided into 4 localized SRS unit BWs. In particular, if a root index value of a Zadoff-Chu (ZC) sequence or a scrambling seed value of a Pseudo Random (PR) sequence is used to generate a localized SRS sequence, the localized SRS sequence may be determined according to at least one of a physical cell ID, a virtual cell ID, a UE-dedicated ID (e.g., Cell-Radio Network Temporary Identifier (C-RNTI)), a UE-common ID (e.g., a UE-common RNTI), a beam ID (or index), a subframe index, a symbol index, or an AP index, (for example, by at least one function thereof).

Structure according to UE capability requirements in New RAT

In New RAT as compared with LTE, it is expected that UE requirements of the eNB and the UE will increase as follows.

UE TRP increase: Demands for an increase in SRS dimensioning (a port, a Cyclic Shift (CS), an Orthogonal Cover Code (OCC), a transmission comb etc.)

Advanced transceiver: An advanced transceiver structure is required to improve interference measurement reporting (network assistant interference control).

UL beam tracking: A UL beam tracking structure is required when beam tracking is required for a UL channel (multi-symbol-wise SRS transmission) as well as a DL channel.

Channel reciprocity: For both cases in which reciprocity between the DL channel and the UL channel is established and is not established, structures are required or when reciprocity between the DL channel and the UL channel is not established (UL SRS needs to be supported for DL channel estimation).

For these various UE capability requirements, a dynamic and flexible SRS configuration is needed and, for efficient control, a structure capable of supporting the configuration within a single UL frame framework should be established.

In a situation in which a plurality of cells is densely deployed, UL inter-cell interference to which a target UE is subjected is greatly generated by Tx beamforming of UEs in neighboring cells (particularly, prepared cells, i.e., cells having strong RSRP during RS measurement of cells), that perform transmission at the same resource location as a resource allocated to the specific UE by a serving cell. Information needed to control such interference may include UE-specific information (i.e., beamforming pattern information of a UE of a neighboring cell directed towards a serving cell (information usable by a serving eNB (or serving cell) to extract received RSRP of a UE of the serving eNB (or serving cell)), site-specific information (i.e., information indicating Tx beam directions of UEs of a neighboring cell, causing UEs in prepared cells to interfere with the target UE in a serving cell, and resource-specific information (i.e., information indicating whether an allocated resource is orthogonal to an interfering resource). Therefore, the serving cell needs to receive the UE-specific information/site-specific information/resource-specific information from neighboring cells to control interference.

However, when the information for interference control is transmitted through Xn signaling, Xn signaling overhead is considerably large. Therefore, it is necessary to provide reasonable Xn signaling overhead by imposing constraints on orthogonality between channels during allocation of each UL channel resource or on beam management in terms of Inter-Cell Interference Coordination (ICIC). To this end, it is necessary to consider a method of measuring and relieving interference through a resource configuration. Notably, the resource configuration needs to be designed by a method supporting a flexibility resource structure required by New RAT.

Figure 5:
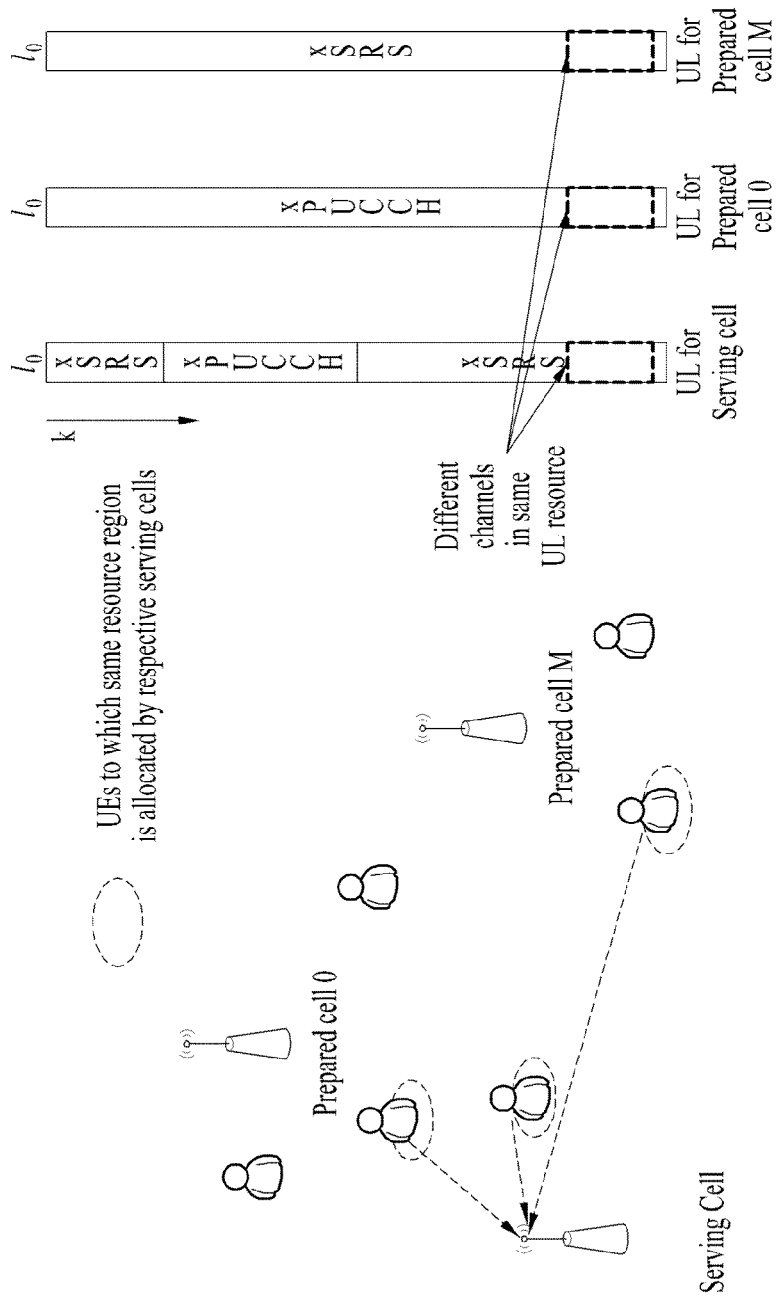
FIG. 5 is a diagram illustrating occurrence of interference according to configurations of various resource structures (localized SRS+xPUCCH, xPUCCH-only, and xSRS-only structures).

FIG. 5 is a diagram illustrating occurrence of interference according to configurations of various resource structures (localized SRS+xPUCCH, xPUCCH-only, and xSRS-only structures).

In FIG. 5, serving cells (serving cell, prepared cell 0, and prepared cell M) allocate the same resource region to respective UEs. Since the serving cells (serving cell, prepared cell 0, and prepared cell M in FIG. 5) allocate, to respective UEs, different channels or resources of different usage (a localized SRS in the serving cell, an xPUCCH in prepared cell 0, and a whole band SRS in prepared cell M) to the same resource, each channel is generated with a sequence of a different length. Therefore, there may be a problem of not fulfilling orthogonality between channels or resources.

If the serving cell and the prepared cells (or neighboring cells) generate channels with sequences of different lengths, each eNB (or cell) needs to previously know a set of all sequences of different lengths and the prepared cells need to accurately inform the serving cell of information about channel regions in which interference occurs in the prepared cells (locations for generating channels and mapping the channels to physical resources). In the case of channels of the same length, interference may be simply relieved using a method designed in terms of orthogonality between channels among methods of relieving inter-cell interference.

Figure 6:
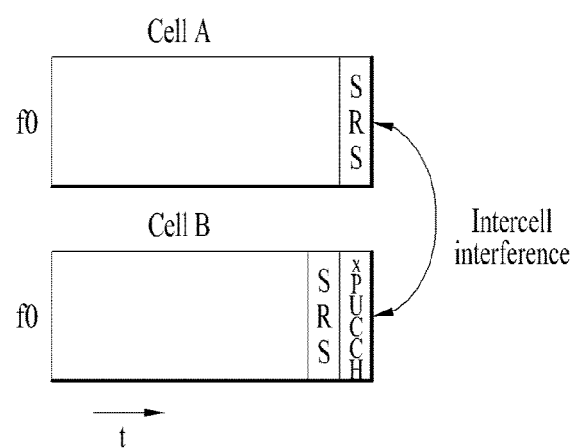
FIG. 6 is a diagram illustrating interference caused by different UL resource configurations between cells.

FIG. 6 is a diagram illustrating interference caused by different UL resource configurations between cells.

As shown in FIG. 6, inter-cell interference may occur between an SRS and a physical UL channel (xPUCCH) due to the SRS configuration of cell A and the xPUCCH configuration of cell B. To cancel the inter-cell interference, the following method may be applied.

1) An SRS and xPUCCH formats 1, 1a, and 1b are designed using a Zadoff Chu (ZC) sequence.

$$r_{u,v}^{(\alpha)}(n)e^{j\alpha n}\bar{r}_{u,v}(n), 0\leq n< M_{sc}^{RS}$$

2) In each channel (i.e., an SRS, an xPUCCH, etc.), u for configuring the root of the ZC sequence is determined using a different group hopping method.

$$u=(f_{gh}(n_s)+f_{ss})\bmod 30, f_{ss}^{xPUCCH}=n_{ID}^{RS} \bmod 30, f_{ss}^{SRS}=n_{ID}^{RS} \bmod 30$$

3) xPUCCH:
$n_{ID}^{RS}=N_{ID}^{cell}$ if no value for $n_{ID}^{xPUCCH}$ is configured by higher layers,
$n_{ID}^{RS}=n_{ID}^{xPUCCH}$ otherwise.

Sounding Reference Signals:
$n_{ID}^{RS}=N_{ID}^{cell}$ if no value for $n_{ID}^{xSRS}$ is configured by higher layers, $n_{ID}^{RS}=n_{ID}^{xSRS}$ otherwise.

According to this method, each BS may detect individual channels by detecting different ZC sequences from an SRS and an xPUCCH even though inter-cell interference exists between the SRS and xPUCCH. However, the method is available when different channels use sequences satisfying the orthogonality condition. In particular, if the resources of an SRS overlap with those of another channel, for example, an xPUCCH format (e.g., xPUCCH format 2) in terms of signal generation, inter-cell interference may occur, and as a result, performance may be degraded.

Inter-Cell Interference Between Different Numerologies of Different Cells

Figure 7:
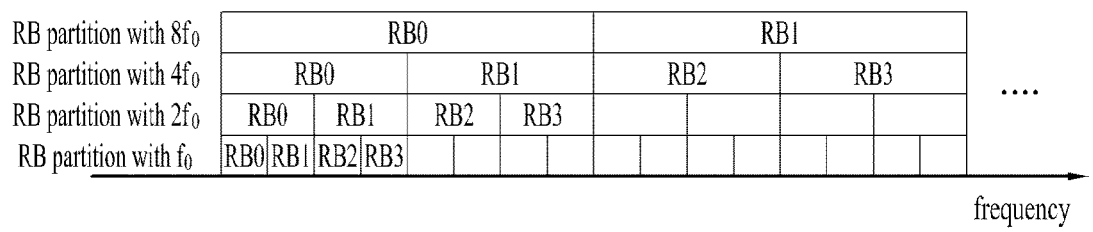
FIG. 7 is a diagram illustrating a structure of multiple numerologies in 3GPP New RAT.

FIG. 7 is a diagram illustrating a structure of multiple numerologies in 3GPP New RAT.

Currently, a basic design direction of 3GPP numerologies is that plural different numerologies coexist as illustrated in FIG. 7. The structure of multiple numerologies in 3GPP New RAT, illustrated in FIG. 7, is described below.

RBs for different numerologies should be located at grids fixed to each other.
For a subcarrier spacing of 15 kHz×2n, RB grids are defined as the subset/superset of an RB grid for a subcarrier spacing of 15 kHz in a nested manner.
Numbering in FIG. 7 is exemplarily shown.
Frequency-domain multiplexing case is FFS.
The contents of time-domain resources supported in New RAT, agreed on in 3GPP, are as follows.
Subframe
  Assume x=14 in a reference numerology (for a normal CP)
  FFS: y=x, or y=x/2, or y is signaled.
Slot
  includes y symbols
  An integer number of slots fit within one subframe
  allows for a control channel in the first symbol in a slot
  allows for a control channel in the end symbol in a slot
  allows for a control channel in the first and end symbols
  Other structures are not precluded
Mini-slot
  should support a transmission unit shorter than y OFDM symbols in a numerology used for transmission.
  allows for a control channel in beginning/end symbol(s) of a mini-slot (both the beginning and end symbols or either the beginning symbol or the end symbol)
  The smallest mini-slot is the smallest scheduling unit (FFS: the number of symbols)
  FFS: Whether New RAT needs to support the slot and mini-slot or the slot and the mini-slot can be merged should be determined.

FIG. 8 is a diagram illustrating an interference problem according to a configuration of multiple different numerologies, in which (a) illustrates a UL inter-cell interference (ICI) between different numerologies and (b) illustrates different configurations of multiple numerologies of cells.

Generally, when UL resources for services having different subcarrier spacings overlap (e.g., eMBB and URLLC), sequence design for orthogonality when services have different numerologies, as well as sequence design for orthogonality in each service, is needed.

Strong ICI According to UL Beam Sweeping

Beam sweeping may use a beam reference signal (BRS) in the case of DL and may be performed by measuring reference signal received power (RSRP) etc. of the BRS as a direction of a reception (Rx) beam of a UE is changed with respect to each BRS. If reciprocity of a transmission (Tx)/Rx beam pair for DL (i.e., an eNB) Tx beam/UE Rx beam pair and a UE Tx beam/eNB Rx beam pair) is satisfied, a Tx/Rx beam pair obtained by the BRS may be applied to UL. Otherwise, a sounding reference signal (SRS) etc. may be used in the case of UL. During the surest UL beam sweeping, SRSs corresponding to all Tx beam IDs of each UE should be transmitted. This means that a PUSCH transmission duration decreases due to SRS transmission so that UL throughput is degraded.

Figure 9:
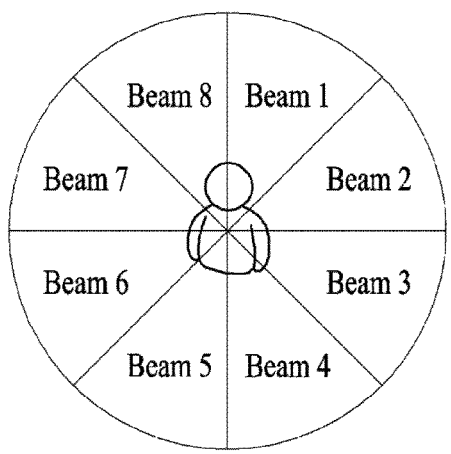
FIG. 9 is a diagram transmission of SRSs corresponding to UE beam IDs (the number of UE Tx beam IDs=8).

FIG. 9 is a diagram transmission of SRSs corresponding to UE beam IDs (the number of UE Tx beam IDs=8).

It can be seen from FIG. 9 that as the number of UE beam IDs increases, the SRS transmission region increases. If periodic SRS transmission is introduced to beam tracking for matching a pair of UE Tx beams and BS RX beams, that is, for establishing UE Tx/BS Rx beam pairs, the number of SRSs for fixed UE Tx candidate beams may be configured by higher layers (for example, a BS may inform the number of SRS transmissions for the fixed UE Tx candidate beams via higher layer signaling (e.g., RRC signaling)). However, if aperiodic SRS transmission is introduced, an additional SRS transmission region is required for additional UE Tx candidate beams. In addition, as the aperiodic SRS transmission is triggered by a UE or a BS, an SRS transmission configuration, which is generated for aperiodic beam tracking, may be presented differently in each beam tracking subframe. Moreover, signaling information for the beam tracking should be provided to UEs whenever the aperiodic SRS transmission is triggered. As a result, signaling overhead may increase. Therefore, a method of efficiently arranging an SRS transmission region and a PUSCH transmission region and a method of reducing signaling overhead thereof are required.

Figure 10:
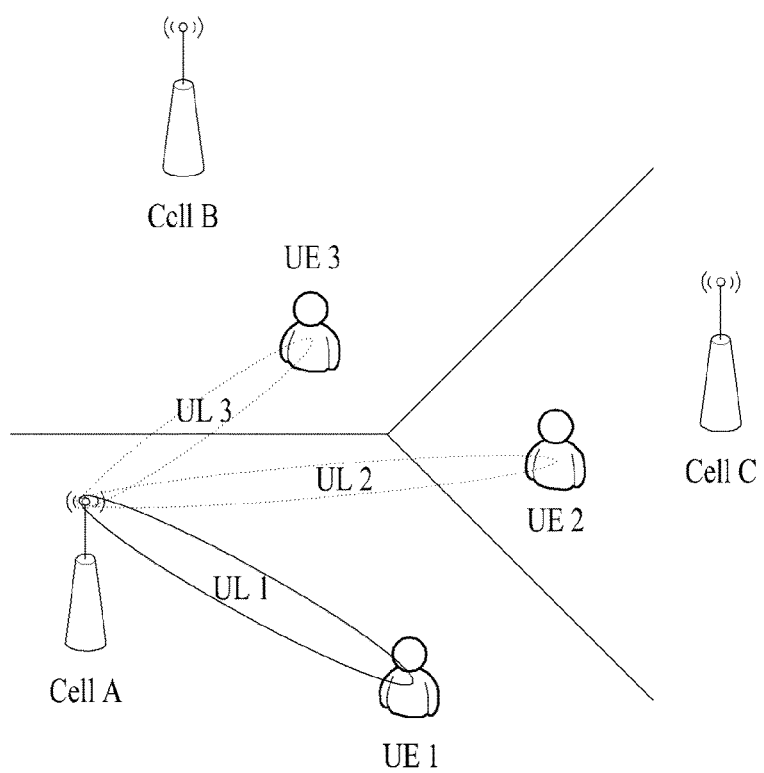
FIG. 10 is an exemplary diagram for explaining different cell interference during UE Tx beam tracking and FIG. 11 is an exemplary diagram for explaining SRS transmission and interference during beam tracking of UE 2 of FIG. 7.
Figure 11:
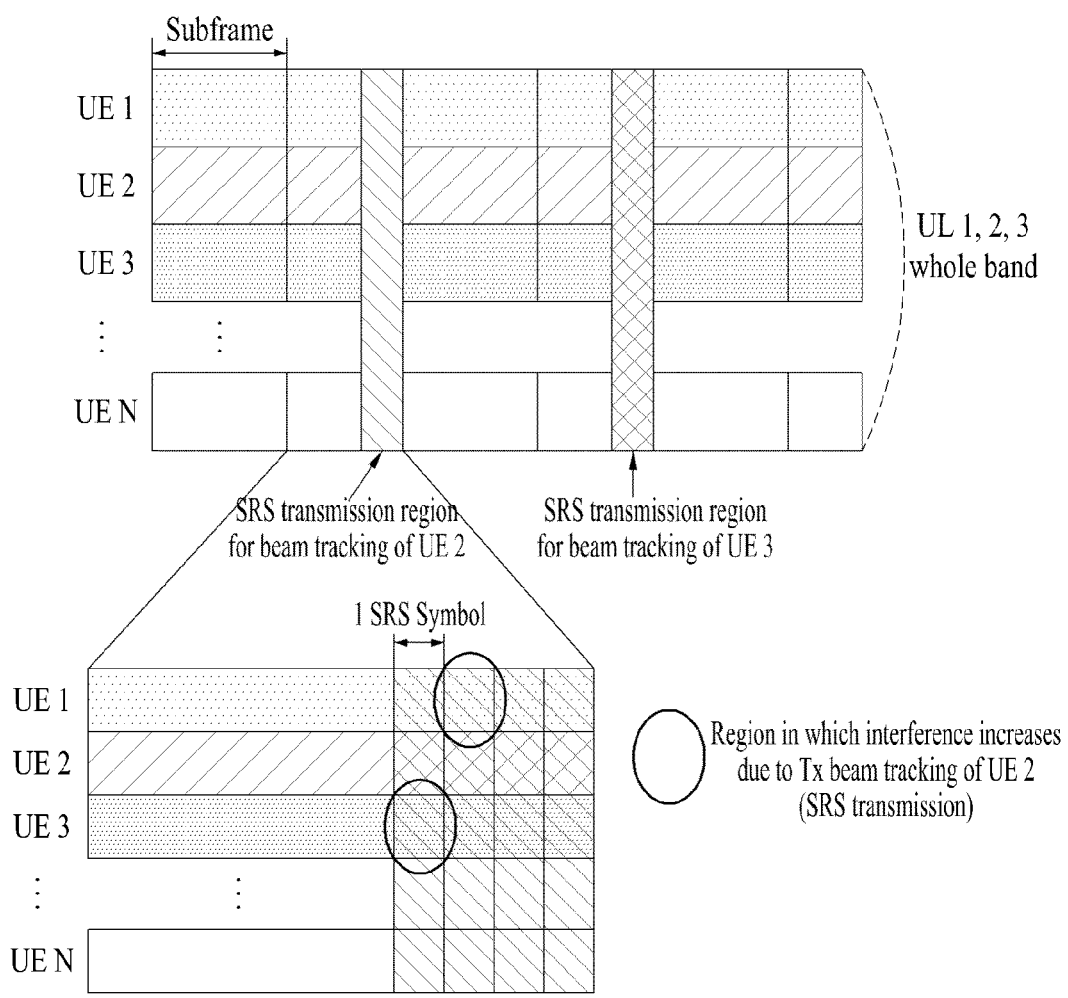

FIG. 10 is an exemplary diagram for explaining different cell interference during UE Tx beam tracking and FIG. 11 is an exemplary diagram for explaining SRS transmission and interference during beam tracking of UE 2 of FIG. 7.

As illustrated in FIG. 10, if UL beam tracking is triggered to perform beam tracking, a UL candidate beam transmits an SRS (generally, the SRS is transmitted over a whole band in a beamformed state) with a beam ID greatly generating interference with respect to other cells. If a UL control channel (e.g., xPUCCH) or a UL data channel (e.g., xPUSCH) is transmitted at that timing on UL of a cell subjected to interference, the SRS greatly creates ICI on the UL channel, so that reception performance may be degraded.

In FIG. 11, an xPUSCH (k,l) resource of UE 1 received by a serving eNB may be indicated by Equation 1 below. Herein, it is assumed that a channel has additive white Gaussian noise (AWGN).

$$\tilde{Z}_{k,l}^{(p),pusch\_UE1} = Z_{k,l}^{(p),pusch\_UE1} + \alpha_{k,l}^{(p),SRS\_UE2} + n \quad \text{[Equation 1]}$$

$\alpha_{k,l}^{(p),SRS\_UE2}$: SRS (k, 1) interference resource of UE 2 corresponding to port p in FIG. 11
$Z_{k,l}^{(p),pusch\_UE1}$: xPUSCH (k, 1) resource of UE 1 corresponding to port p in FIG. 11

Referring to FIG. 11, an SRS for beam tracking of UE 2 may be transmitted over a whole band in a corresponding symbol. If UE 1 or UE 3 performs transmission of a UL control channel or a UL data channel in the corresponding symbol, interference in the corresponding symbol increases due to the SRS of UE 2.

FIG. 12 is a diagram illustrating an interference relationship according to a beam pair order for multiple SRS transmission.

(a) of FIG. 12 illustrates the case in which an order of beam pairs for multiple SRS transmission in a time duration of K1 is the same and (b) of FIG. 12 illustrates the case in which an order of beam pairs for multiple SRS transmission in a time duration of K1 is different. UL interference may differ according to an order configuration of beam pairs for SRS transmission for UL beam sweeping.

FIG. 13 is a diagram illustrating segmentation of a resource region according to an ICI level.

A resource region may be segmented according to the difference in variation of UL interference. In (a) of FIG. 13, the resource region is segmented into regions A and B based on variation of ICI (or an interference level). It may be assumed that region A has almost no variation in channel as a resource region for UL data transmission. That is, in region A, ICI is similar (UE Tx beam/TRP Rx beam pair is maintained in a measurement region). Region B corresponds to a region in which an interference variation of an SRS transmission unit (e.g., a symbol or a sub-symbol) is considerable due to UE Tx beam sweeping per SRS transmission unit (e.g., a symbol or a sub-symbol) according to configuration of UL beam sweeping (full or localized SRS transmission) of cell 1 in region B even under the assumption that there is almost no channel variation. That is, region B may be a resource region configured for UL beam sweeping in a neighboring cell (e.g., cell 1).

(b) of FIG. 13 illustrates region segmentation according to an interference variation during UL beam sweeping in neighboring cells (e.g., cell 2 and cell 3). Regions A and B correspond to regions A and B described in (a) of FIG. 13. Region C is a region in which interference may be easily cancelled by generating an orthogonal sequence of an SRS between cells but is supplementarily used in an interference measurement and management part since there is no impact of interference on a UL data part.

In new UL resource management, although the resource region may be segmented into various interference regions using technologies for causing interference regions to have different interference levels, the segmented regions are limited herein to regions subjected to interference caused by UL beam sweeping. To distinguish between regions having different interference levels, even the neighboring cells (cell 2 and cell 3) need to be aware of a location at which UL beam sweeping of another cell, i.e., a serving cell (e.g., cell 1), occurs, as illustrated in FIG. 13. To enable the neighboring cells (cell 2 and cell 3) to be aware of the location of UL beam sweeping of cell 1, cell 1 may indicate a UL beam sweeping operation to cell 2 and cell 3 through X2 signaling whenever UL beam sweeping configuration is triggered. This operation increases X2 signaling overhead. A transmission time duration of multiple SRSs for UL beam sweeping of a UE needs to be calculated to be sufficiently long due to processing time of X2 signaling itself. If the UE should perform UL beam refinement as fast as possible at a timing at which UL beam refinement is triggered after an eNB determines that a link is unstable, it may not be easy to distinguish between the regions. Accordingly, in order to minimize X2 signaling and previously distinguish between the regions, the UE may consider periodic or semi-persistent SRS transmission for UL beam refinement.

In a 3GPP LTE/LTE-A system, the concept of UL beam refinement using DL reciprocity has not existed and only a measurement and reporting method for ICIC on DL has been described. Generally, interference measurement is supposed to measure ICI using a cell-specific RS (CRS), a CSI-RS, or zero power (ZP)-CSI RS. A coordination method in which the UE reports RSRP or reference signal received quality (RSRQ) to the eNB to avoid ICI has been known. A representative example is an almost blank subframe and cell range expansion. The following table 10 shows the definition of an almost blank subframe (ABS).

TABLE 10 almost blank subframe (ABS): subframe with reduced transmit power (including no transmission) on some physical channels and/or reduced activity. The eNB ensures backwards compatibility towards UEs by transmitting necessary control channels and physical signals as well as System Information.

Generally, for radio resource management (RRM), a demodulation reference signal (DMRS) part during 200 ms based on an LTE system is removed and averaged to calculate RSRP and RSSI, thereby performing RRM. In DL interference measurement, an ABS status is first calculated for an ABS operation. The UE measures RSRP and a signal-to-interference-plus noise ratio (SINR) of a CRS transmitted by the eNB and transmits channel quality information (CQI). CQI feedback is received for a specific duration (i.e. 50 ms). If $\bar{I}_{CQI}$ obtained from processing of CQI feedback (e.g., average $$CQI\ \bar{I}_{CQI} = \frac{\sum_{i=0}^{M-1} I_{CQI,i}}{M},$$

updated CQI $\bar{I}_{CQI}[i]=\alpha I_{CQI}[i]+(1-\alpha)I_{CQI}[i-1]$, etc.) is below a predetermined threshold value, the UE that has reported CQI processing is specified as a victim UE. A serving cell activates the ABS status for neighboring cells. Therefore, the neighboring cells allocate a resource through ABS configuration having a predetermined pattern.

An aggressor cell (a cell generating interference) transmits information about two sets (a bitmap indicating a subframe corresponding to an ABS and a bitmap indicating an ABS subset for measurement) to a victim cell (a cell subjected to interference) through an X2 interface. The aggressor cell may share information with the victim cell through the X2 interface.

UE Measurement/Reporting Method

Since the UE is not aware of which subframe corresponds to an ABS, the UE performs resource-specific measurement and reporting. The serving eNB may inform the victim UE (a UE subjected to interference) of information about a subframe set. The subframe set includes two subframe sets (a subframe set for radio link failure (RLF) and RRM and a subframe set for CSI reporting).

The subframe set for RLF and RRM serves to determine RLF and RRM and may be relatively statically configured on a long-term basis. The subframe set for CSI reporting indicates a reporting subframe for a CSI type for an ABS and a non-ABS and a CSI type for an ABS of aggressor cell 1 and an ABS of aggressor cell 2.

A CSI reporting method will now be described with reference to FIG. 13.

FIG. 14 is a diagram illustrating a CSI reporting method.

As illustrated in (a) of FIG. 14, subframes for a CSI type may be configured not to overlap. (a) of FIG. 14 relates to periodic CSI reporting. Periodic CSI reporting for subframe set (subframe #0) associated with each type is performed in subframe #n+3.

(b) of FIG. 14 illustrates an aperiodic CSI reporting method based on DL triggering.

Problem According to Legacy RSRP and RSRQ Measurement

For RRM measurement used in a higher layer such as layer 3 (L3), RSRP should be measured. This method mainly requires a measurement duration of about 200 ms. For interference measurement in the LTE system, the UE measures a CRS during a specific duration. In the ABS, a minimum measurement length is a subframe length. Thus, a method of averaging out the CRS in the subframe is used. In a New RAT system, an allocated frequency resource differs according to each service. When UL interference measurement is performed in a situation in which UL beam sweeping is introduced, the amount of interference per symbol may differ due to beam sweeping per UL symbol. For this reason, it is undesirable to apply a legacy interference measurement method to New RAT UL. That is, a method of measuring UL interference per symbol or per sub-band is needed.

Although ICIC configuration satisfying New RAT requirements is needed, a New RAT UL ICIC method will be described in the present invention. More specifically, a method for reducing UL interference when channel-level reciprocity or beam-level reciprocity is not matched.

UL Interference Method

FIG. 15 is a diagram illustrating UL transmission of UEs and deployment of DMRSs.

(a) of FIG. 15 illustrates a basic UL transmission structure and (b) of FIG. 15 illustrates elimination of DMRS reception of an eNB through legacy DMRS information.

A UL DMRS part and an SRS part may be configured with a pattern agreed on between the eNB and the UE. That is, both the eNB and the UE share information about an SRS sequence generation method and a resource location. UL interference measurement implies measurement of interference generated from other cells in a UL data region. As illustrated in (a) of FIG. 15, DMRSs are generally mapped in the UL data region. Therefore, basic UL interference measurement is performed such that the eNB eliminates received DMRS parts, average powers in regions in which the DMRS parts are eliminated, and then measures average UL interference.

In New RAT, due to a situation in which various numerologies/services coexist and various structures of UL channels coexist and configuration such as UL beam sweeping which has not existed in a legacy environment, it is expected that variations in UL channels and measurement will greatly occur and thus variations in ICI may also variously appear. Therefore, a legacy measurement and reporting method is not sufficient to acquire and determine ICI information and it is necessary to consider a new measurement and reporting method that may consider various situations in New RAT. The present invention proposes a measurement and resource allocation method for relieving UL ICI in a New RAT structure.

Embodiment 1

Embodiment 1 as an embodiment of the present invention specifies or determines a victim UE through interference measurement of each region by distinguishing between regions in which an interference level is similar in a UL resource region. That is, a resource region for interference measurement may be segmented according to an SRS configuration method for UL beam sweeping. For an SRS configuration method for UL beam sweeping, the following four cases may be considered.

(1) Case in which each cell has the same number of Tx beams configured for UL beam sweeping and an equally configured UE Tx beam sweeping order in a UL resource duration in which specific TRP Rx beams are successively present.

(2) Case in which each cell has the same number of Tx beams configured for UL beam sweeping and a differently configured UE Tx beam sweeping order in a UL resource duration in which specific TRP Rx beams are successively present.

(3) Case in which each cell has a different number of Tx beams configured for UL beam sweeping and an equally configured UE Tx beam sweeping order in a UL resource duration in which specific TRP Rx beams are successively present.

(4) Case in which each cell has a different number of Tx beams configured for UL beam sweeping and a differently configured UE Tx beam sweeping order in a UL resource duration in which specific TRP Rx beams are successively present.

A measurement method for interference measurement region A illustrated in FIG. 13 will be referred to as Type a. The interference measurement method of Type a is performed as follows.

A. A serving cell measures an SINR for DMRSs of corresponding subframes during a specific duration (configured by a higher layer). For a UE of index k, an average SINR, $$\overline{SINR}^{(k)} = \frac{\sum_{i=0}^{M-1} \overline{SINR}_i^{(k)}}{M},$$

and an updated $\overline{SINR}^{(k)}[i] = \alpha \overline{SINR}^{(k)}[i] + (1-\alpha)\overline{SINR}^{(k)}[i-1]$. may be considered. Herein, i is a sequential DMRS counting index.

B. A UE having a measured SINR lower than a target SINR (or an SINR threshold) is specified or defined as a victim UE. Information about the SINR threshold may be provided by an eNB to a UE through RRC signaling or downlink control information (DCI).

Type b refers to an interference measurement method in region C in which an SRS is transmitted in one symbol. The interference measurement method of Type b may be performed as follows.

A. Since the SRS is transmitted with the same beam pair as a beam pair with which a DMRS is transmitted, the eNB may calculate an SINR by adding SRS measurement and DMRS measurement with respect to an SRS transmission symbol part and a DMRS part or calculate the SINR with respect to each of the SRS part and the DMRS part.

$$\overline{SINR}_M^{(k)} = \frac{\sum_{i=0}^{M-1} \overline{SINR}^{(k)}(i)}{M}$$

B. Herein, i=0~M and M denotes the number of DMRS resource elements (REs) in a UL resource allocated to UE k, the number of SRS REs, or the number of DMRS REs plus the number of SRS REs. $SINR^{(k)}_{(i)}$ denotes an SINR of an i-th DMRS or SRS RE in a UL resource allocated to UE k.

C. Generally, Type b may be used when transmission reception point (TRP) Tx/UE Rx beam correspondence is satisfied.

Figure 16:
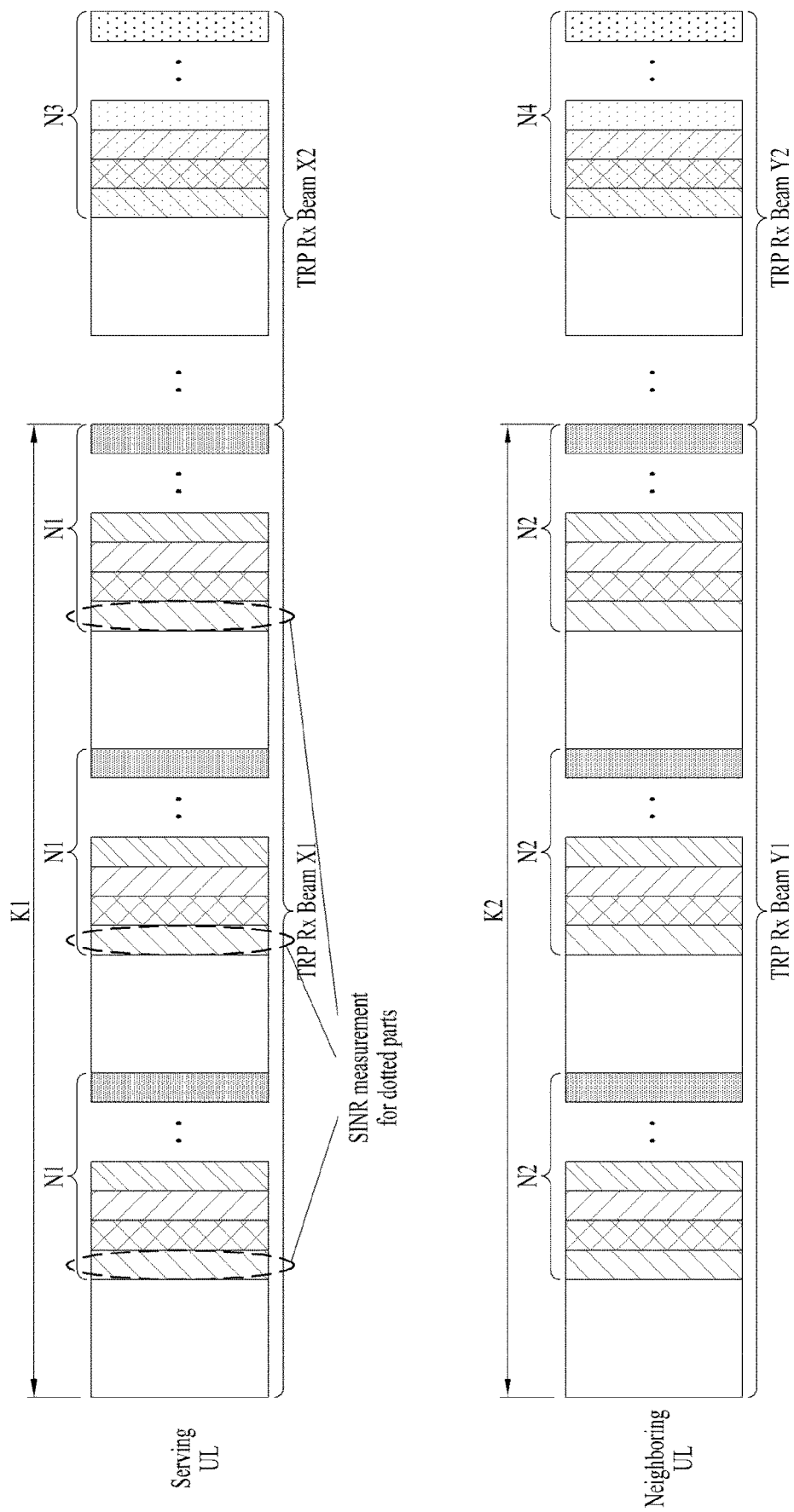
FIG. 16 is a diagram illustrating interference measurement according to a specific UE Tx beam and a TRP Rx beam.

FIG. 16 is a diagram illustrating interference measurement according to a specific UE Tx beam and a TRP Rx beam.

Type c-1 refers to a type of measuring SINRs of resources corresponding to a specific beam pair in region C when a beam pair order is the same and SRS transmission length is the same in the case in which multiple SRS symbols are transmitted during a specific duration. In an example of FIG. 16, Type c-1 corresponds to the case in which N1=N2 (each cell has the same number of UE Tx beams or the same number of SRS symbols to which the UE Tx beams are mapped during UL beam sweeping SRS configuration) and K1=K2 (each cell has the same SRS transmission length corresponding to one TRP Rx beam during UL beam sweeping SRS configuration). The eNB measures an SINR in an SRS region indicated by dotted lines. That is, a serving cell measures an SINR in an SRS region unit corresponding to a UE Tx beam ID (e.g., one Tx beam ID) according to Type c-1. The serving cell may transmit information about a UE Tx beam ID generating strong interference or a resource corresponding to the UE Tx beam ID generating strong interference (e.g., symbol index) to a serving UE. The SINR may be indicated as Equation 2 below.

$$\overline{SINR^{(k)}_{j,K1}} = \frac{\sum_{i}^{M}\sum_{n_{sf}}^{K1} SINR^{(k)}(i, j)}{K1 \times M},$$ [Equation 2]

where $j = \arg_l \mod (\tilde{l}+2\times N_{symb}^{UL})=0$, $n_{sf} \leq K1$, $n_{sf}$ is a subframe counter, and $SINR^{(k)}_{(i,j)}$ denotes an SINR in an i-th SRS RE at symbol location j.

$\tilde{l}$ denotes a specific UE Tx beam (e.g., a symbol index or an SRS resource location index represented by dotted lines in FIG. 16). SINRs up to K1 are measured and an average SINR is measured.

Figure 17:
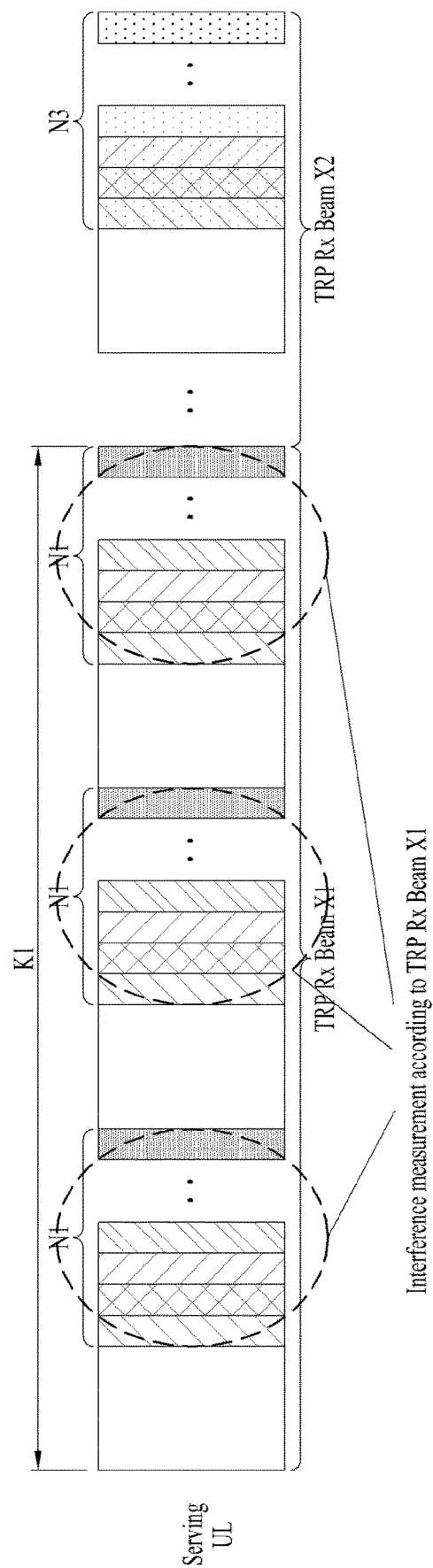
FIG. 17 is a diagram illustrating interference measurement for a specific TRP Rx beam.

FIG. 17 is a diagram illustrating interference measurement for a specific TRP Rx beam.

Type c-2 may be used for UL resource interference measurement for a fixed TRP Rx beam when N1=N2 and K1=K2. SINRs of multiple SRS transmission regions may be measured during an interval of K1 illustrated in FIG. 17. That is, the serving cell measures an SINR for a resource region corresponding to the same TRP Rx beam ID. An SINR measured according to Type c-2 may be indicated as Equation 3 below.

$$\overline{SINR^{(k)}_{K1}} = \frac{\sum_{n_{sf}}^{K1}\sum_{i}^{N1} SINR^{(k)}(i)}{K1 \times N1},$$ [Equation 3]

$n_{sf} \leq K1$ and $n_{sf}$ is a subframe counter

Figure 18:
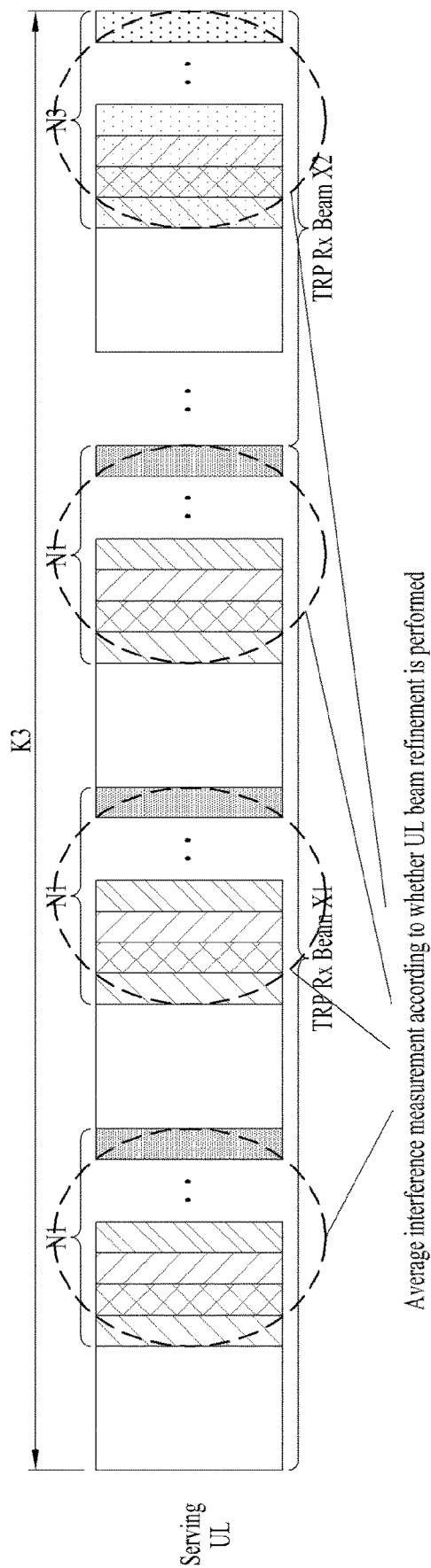
FIG. 18 is a diagram illustrating an interference measurement method for determining whether UL beam refinement is used.

FIG. 18 is a diagram illustrating an interference measurement method for determining whether UL beam refinement is used.

Type c-3 is a type for interference measurement of UL beam sweeping itself when N1=N2 and K1=K2. A serving cell measures an SINR for a resource region for UL beam refinement in region C. The serving cell measures SINRs for multiple SRSs during any specific duration K3 to determine whether UL beam refinement is used. Equation 4 below indicates an SINR measurement method according to Type c-3 (e.g., average interference measurement according to UL beam refinement).

$$\overline{SINR^{(k)}_{K3}} = \frac{\sum_{i}^{K3} SINR^{(k)}(i)}{K3}$$ [Equation 4]

Figure 19:
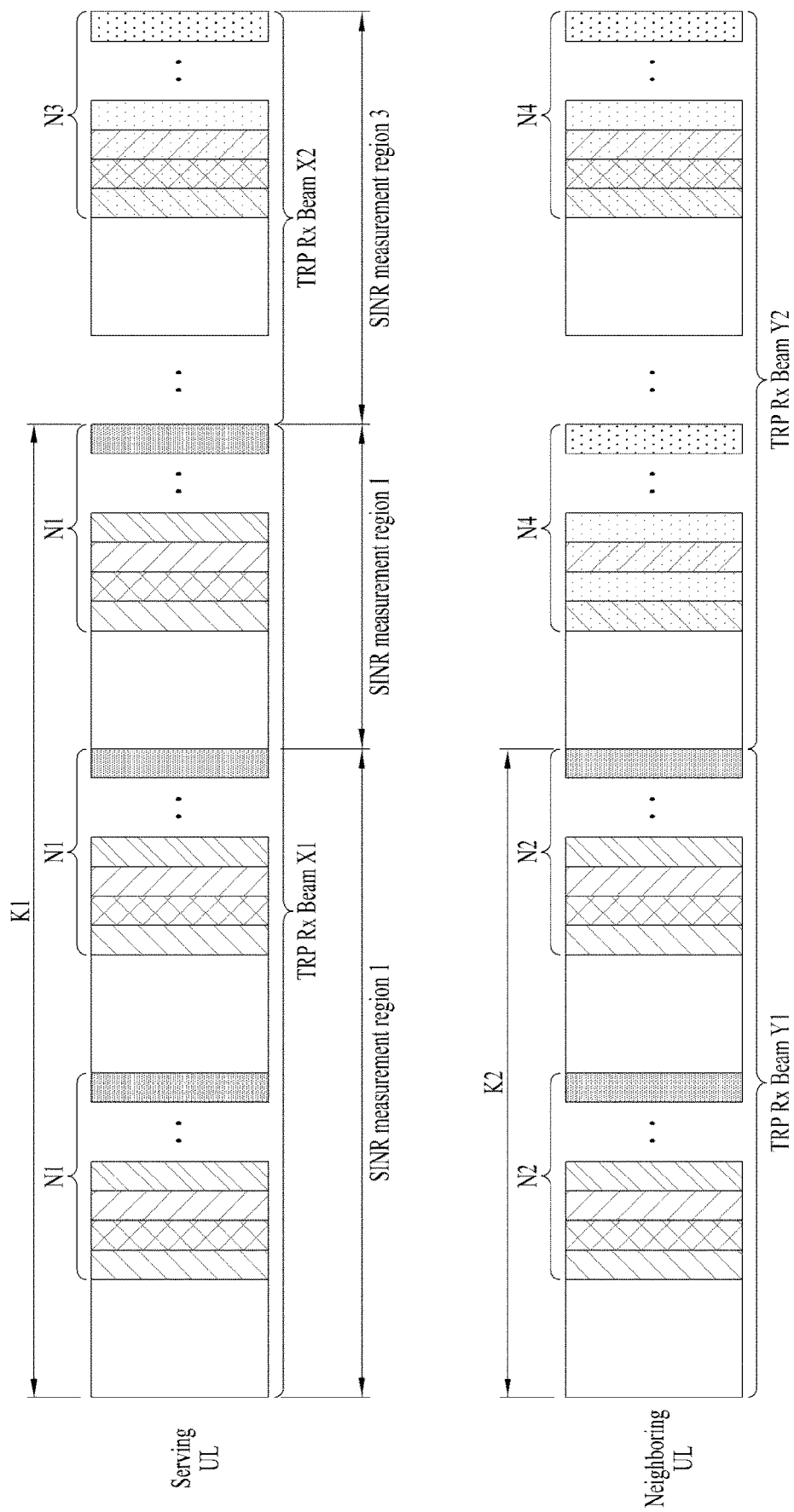
FIG. 19 is a diagram illustrating an SINR measurement method when a transmission length differs according to a TRP Rx beam.

FIG. 19 is a diagram illustrating an SINR measurement method when a transmission length differs according to a TRP Rx beam.

When each cell has a different transmission length of a TRP Rx beam, i.e., when K1≠K2 and N1=N2=N3=N4, an SINR measurement region may be divided as illustrated in FIG. 19. FIG. 19 illustrates a scheme of dividing an SINR measurement region into three regions and measuring interference within each divided region. That is, when K1 is larger than K2, an SINR measurement region corresponding to length K2 may be configured as illustrated in FIG. 19. If each cell includes information about periodic SRS configuration, it is possible to distinguish between a serving cell and neighboring cells. Alternatively, when aperiodic SRSs are considered, the eNB may inform the UE of information about aperiodic SRS configuration through DCI.

Figure 20:
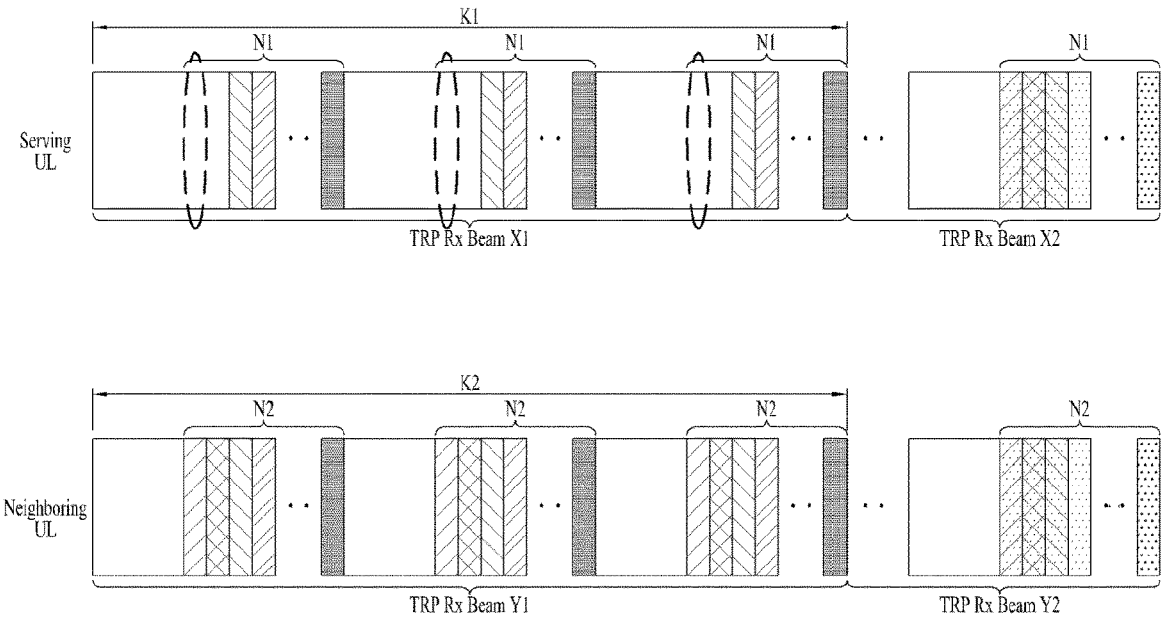
FIGS. 20 and 21 are diagrams illustrating interference measurement methods using a DMRS in region B illustrated in FIG. 13
Figure 21:
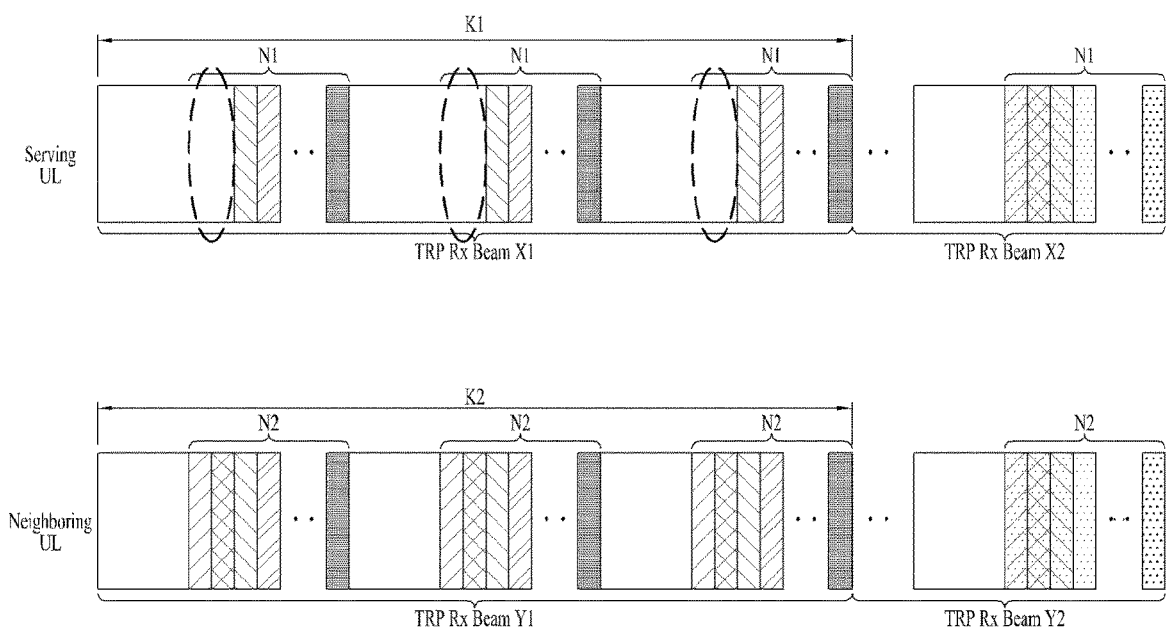

FIGS. 20 and 21 are diagrams illustrating interference measurement methods using a DMRS in region B illustrated in FIG. 13.

Region B illustrated in FIG. 13 occurs when N1 and N2 in FIGS. 20 and 21 have different values. In this case, a UL data region of a neighboring cell may act as interference with respect to a region for UL beam refinement of a serving cell or a region for UL beam refinement in a neighboring cell may act as interference with respect to a UL part of a serving cell. FIGS. 20 and 21 illustrate examples when N2>N1 and illustrate measurement of an SINR for a DMRS part of region B illustrated in FIG. 13.

FIG. 20 illustrates DMRS regions (indicated by dotted lines) for interference measurement of the same beam pair and FIG. 21 illustrates DMRS regions for interference measurement of the same TRP Rx beam. A method for interference measurement of the same beam pair using a DMRS illustrated in FIG. 20 may be referred to as Type d-1 and a method for interference measurement of the same TRP Rx beam using a DMRS illustrated in FIG. 21 may be referred to as Type d-2.

In Type d-1 method, the eNB may transmit information about a symbol index in which an SINR is measured to the UE through the DCI. Alternatively, the eNB may indicate that a corresponding region is a region having strong interference to the UE using a corresponding UL symbol during UL grant transmission. In Type d-2 method, the eNB may provide the UE with information about a TRP Rx index in which an SINR is measured or a UL resource location corresponding to the index.

Figure 22:
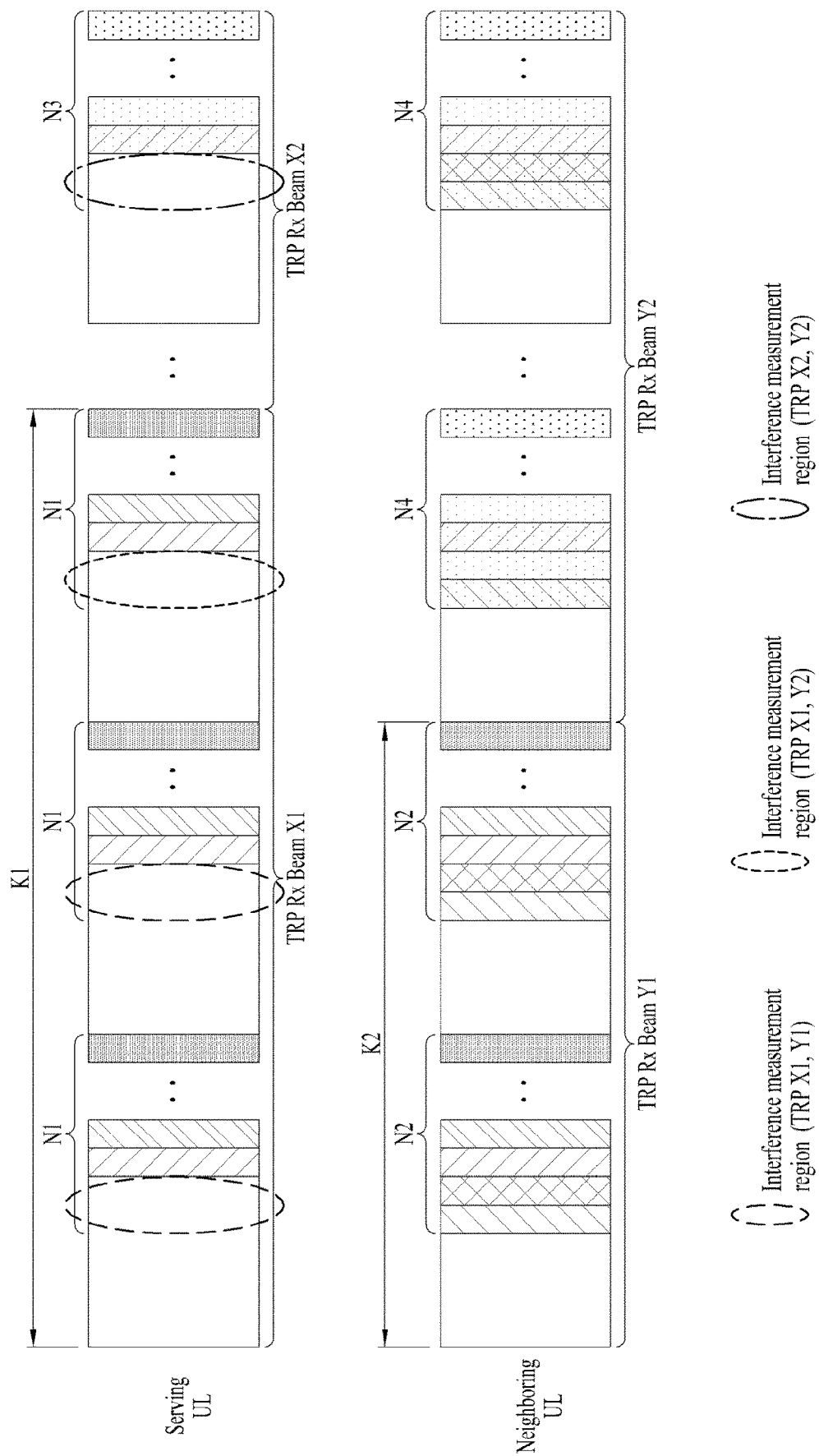
FIG. 22 is a diagram illustrating an interference measurement method (by dividing an interference measurement region) using a DMRS for region B.

FIG. 22 is a diagram illustrating an interference measurement method (by dividing an interference measurement region) using a DMRS for region B.

An interference measurement region may be divided as illustrated in FIG. 22. When K1≠K2 and N1≠N2 in periodic or semi-persistent configuration for UL beam refinement, the eNB may measure interference using Type d-1 or Type d-2 in different SINR measurement regions.

Figure 23:
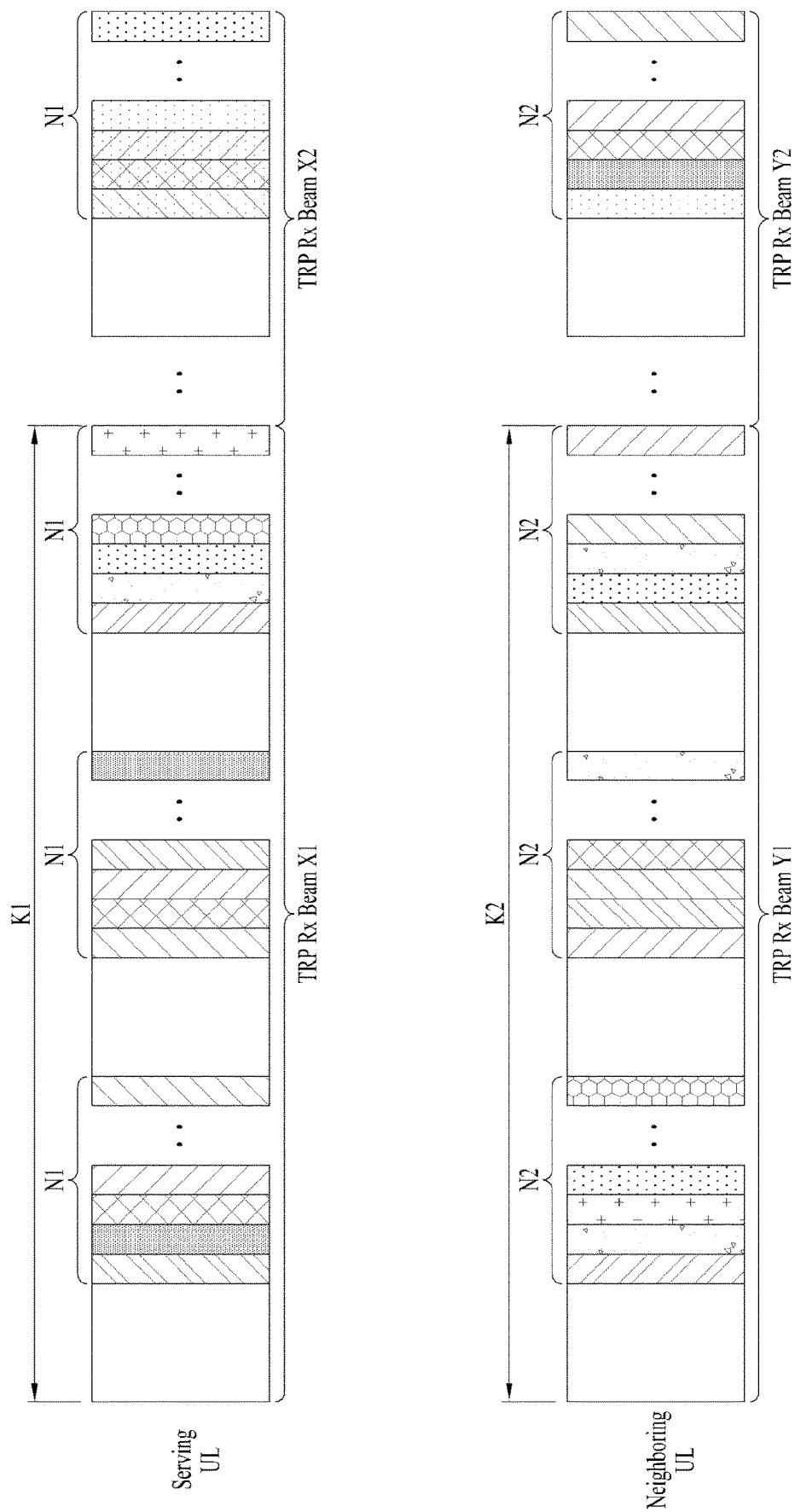
FIG. 23 is a diagram illustrating SRS transmission in different Tx beam transmission patterns.

FIG. 23 is a diagram illustrating SRS transmission in different Tx beam transmission patterns.

When a beam transmission pattern for UL beam refinement differs whenever an SRS is transmitted, a method of measuring an SINR per different specific symbol or measuring an average SINR on a long-term basis to determine whether entire UL beam refinement is used may be considered. Type e is limited to a type for measuring average interference for entire UL beam refinement (even when K1=K2 and all Ns are equal). The SINR measurement method per specific symbol is favorable for measurement of a short term. However, the SINR measurement method per specific symbol is not easy to use for interference measurement and management when taking into account channel aging.

A brief description of types for interference measurement described above and a description for declaring and determining a victim UE according to the types for interference measurement are listed in Table 11 below. If a condition is satisfied, one UE may be defined as one or multiple victim UEs. Table 11 illustrates an example of distinguishing between victim UEs according to each SINR measurement method.

TABLE 11

| SINR measurement method for specifying victim UE | Description | Threshold $\alpha$ | Victim UE determination (UE k) |
|---|---|---|---|
| Type a | SINR measurement of DMRS part of region A | $\overline{SINR}_{from\_a}^{(k)} \leq \alpha$ | $k_{victim}^0$ |
| Type b | SINR measurement (DMRS/SRS) during SRS transmission in one symbol | $\overline{SINR}_{from\_b}^{(k)} \leq \alpha$ | $k_{victim}^1$ |
| Type c-1 | SINR measurement based on UE Tx beam of region C (Measurement in symbol unit) $$\overline{SINR}_{j,K1}^{(k)} = \frac{\sum_{i}^{M} \sum_{n_{sf}}^{K1} SINR_{(i,j)}^{(k)}}{K1 \times M},$$ where $j = \arg_l \bar{t} \mod(\bar{t} + 2 \times N_{symb}^{UL}) = 0.$ and $n_{sf} \leq K1$ | $\overline{SINR}_{from\_c\_1}^{(k)} \leq \alpha$ | $k_{victim}^2$ |
| Type c-2 | SINR measurement based on TRP Rx beam of region C (Measurement in TRP Rx beam unit) $$\overline{SINR}_{K1}^{(k)} = \frac{\sum_{n_{sf}}^{K1} \sum_{i}^{N1} SINR_{(i)}^{(k)}}{K1 \times N1},$$ where $n_{sf} \leq K1$ | $\overline{SINR}_{from\_c\_2}^{(k)} \leq \alpha$ | $k_{victim}^3$ |
| Type c-3 | SINR measurement based on UL beam refinement of region C $$\overline{SINR}_{K3}^{(k)} = \frac{\sum_{i}^{K3} SINR^{(k)}(i)}{K3}$$ | $\overline{SINR}_{from\_c\_3}^{(k)} \leq \alpha$ | $k_{victim}^4$ |
| Type d-1 | SINR measurement of DMRS part of region B (measurement in symbol unit) $$\overline{SINR}_{j,K1}^{(k)} = \frac{\sum_{i}^{M} \sum_{n_{sf}}^{K1} SINR_{(i,j)}^{(k)}}{K1 \times M},$$ where $j = \arg_l t \mod(\bar{t} + 2 \times N_{symb}^{UL}) = 0$ and $N_{sf} \leq K1$ | $\overline{SINR}_{from\_d\_1}^{(k)} \leq \alpha$ | $k_{victim}^5$ |
| Type d-2 | SINR measurement of DMRS part of region B (measurement in TRP Rx beam unit) $$\overline{SINR}_{K1}^{(k)} = \frac{\sum_{n_{sf}}^{K1} \sum_{i}^{N1} SINR_{(i)}^{(k)}}{K1 \times N1},$$ where $n_{sf} \leq K1$ | $\overline{SINR}_{from\_d\_2}^{(k)} \leq \alpha$ | $k_{victim}^6$ |
| Type e | SINR measurement based on UL beam refinement $$\overline{SINR}_{K3}^{(k)} = \frac{\sum_{i}^{K3} SINR^{(k)}(i)}{K3}$$ | $\overline{SINR}_{from\_e}^{(k)} \leq \alpha$ | $k_{victim}^7$ |

Hereinafter, a UE operation for ICIC according to declaration and determination of each victim UE will be described. A UE allocated according to each type of the interference measurement method illustrated in Table 11 may be configured as one or multiple victim UEs.

Figure 24:
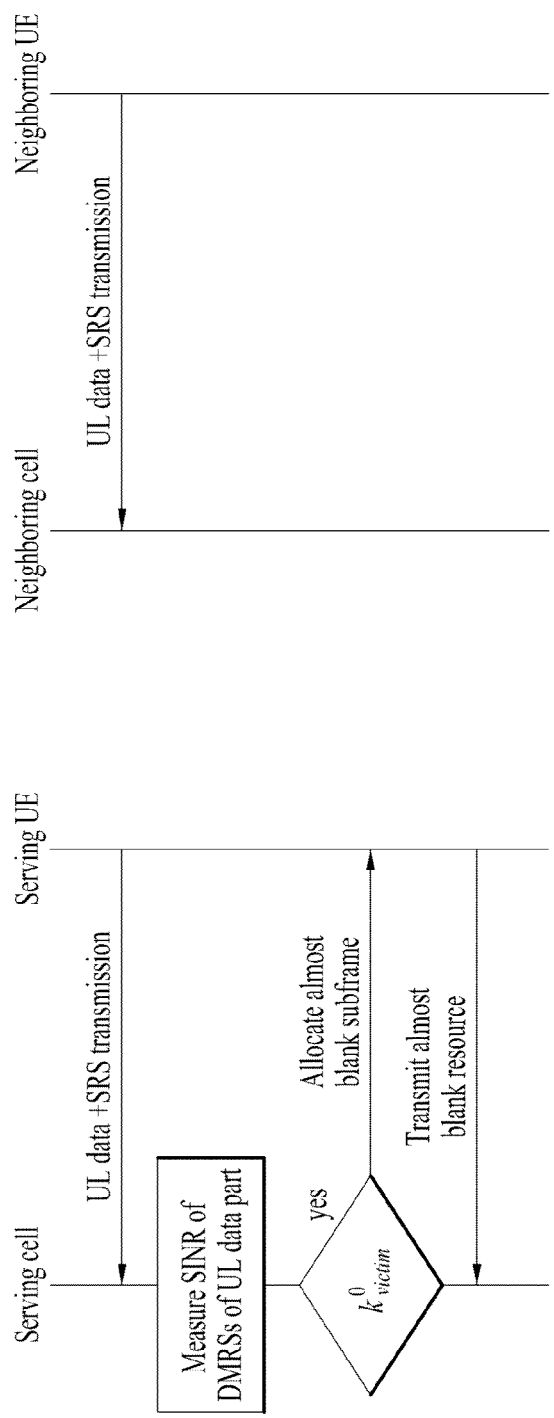
FIG. 24 is a diagram for explaining an operation for ICIC when a victim UE according to Type a is UE $k_{victim}^0$ and FIG. 25 is a diagram for explaining an operation for ICIC when a victim UE according to Type b is UE $k_{victim}^1$.
Figure 25:
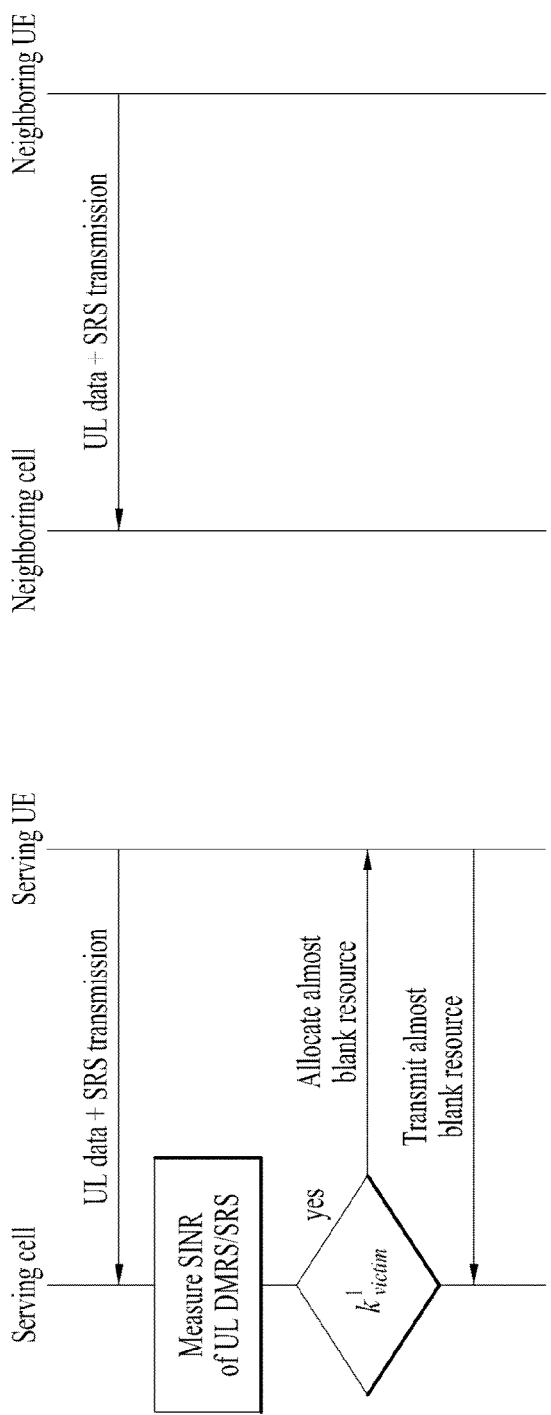

FIG. 24 is a diagram for explaining an operation for ICIC when a victim UE according to Type a is UE $k_{victim}^0$ and FIG. 25 is a diagram for explaining an operation for ICIC when a victim UE according to Type b is UE $k_{victim}^1$.

Referring to FIG. 24, a serving UE within a serving cell may transmit UL data and an SRS to the serving cell. A neighboring UE within a neighboring cell may transmit the UL data and the SRS to the neighboring cell. Then, the serving cell may measure an SINR using DMRSs in a UL data region. If the serving UE is determined as a victim UE as a result of SINR measurement, the serving cell may transmit information about allocation of an almost blank resource to the serving UE. The serving UE may transmit a UL signal on resources except for the almost blank resource based on the information about allocation of the almost blank resource.

Referring to FIG. 25, FIG. 25 is different from FIG. 24 in that the serving cell measures interference according to Type b which is an example of the interference measurement method. The serving cell may determine the victim UE by measuring an SINR in a UL DMRS/SRS region. If the serving UE is determined as the victim UE as a result of SINR measurement, the serving cell may transmit information about allocation of an almost blank resource to the serving UE. The almost blank resource may be differently configured according to whether DMRS or SRS configuration is included. The eNB may designate the almost blank resource to the UE through DCI. The serving terminal may transmit a UL signal on resources except for the almost blank resource based on information about allocation of the almost blank resource to the UE.

Figure 26:
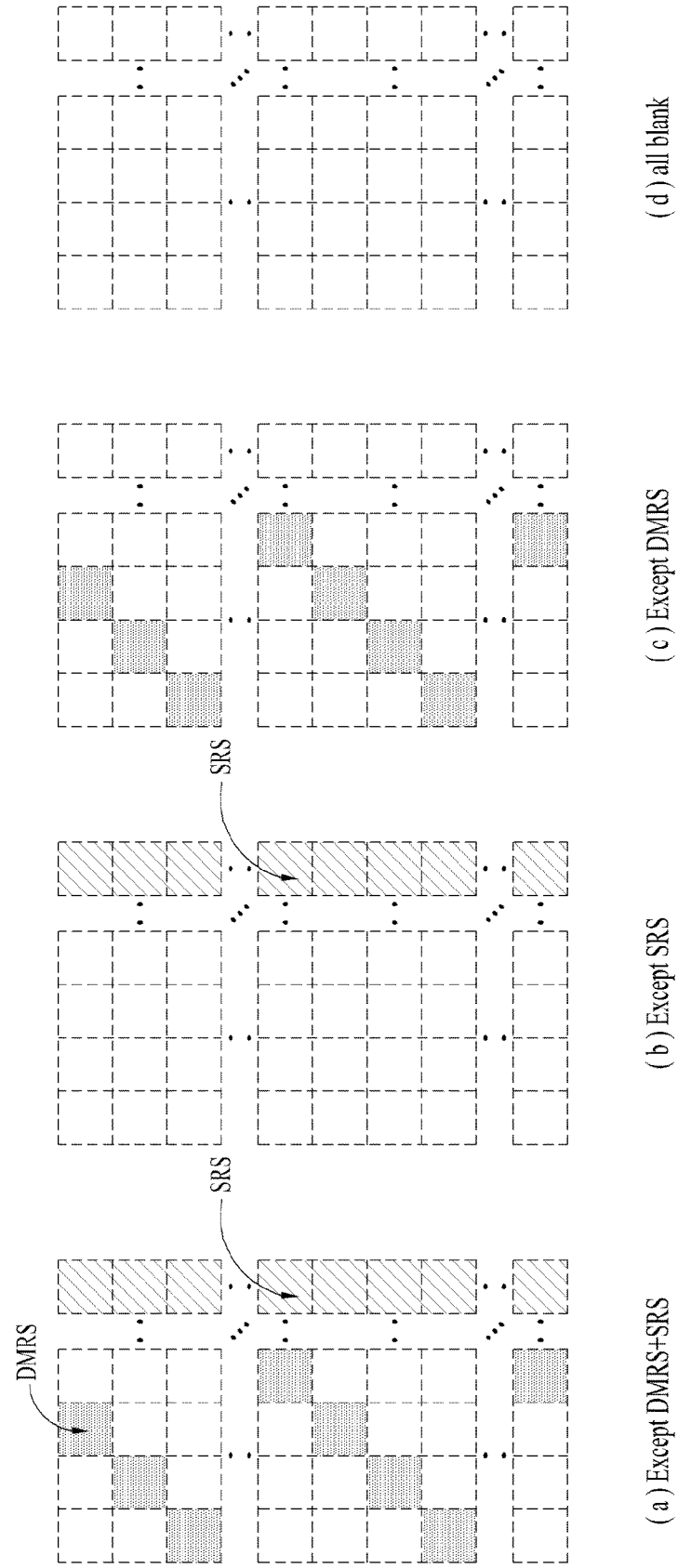
FIG. 26 is a diagram illustrating almost blank resource allocation.

FIG. 26 is a diagram illustrating almost blank resource allocation.

Referring to (a) of FIG. 26, an almost blank resource may be configured by resources except for a DMRS and an SRS. As illustrated in (b) of FIG. 26, the almost blank resource may be configured by resources except for the SRS. Conversely, as illustrated in (c) of FIG. 26, the almost blank resource may be configured by resources except for the DMRS. (d) of FIG. 26 illustrates that the almost blank resource may be configured by resources including all of the DMRS and the SRS.

Figure 27:
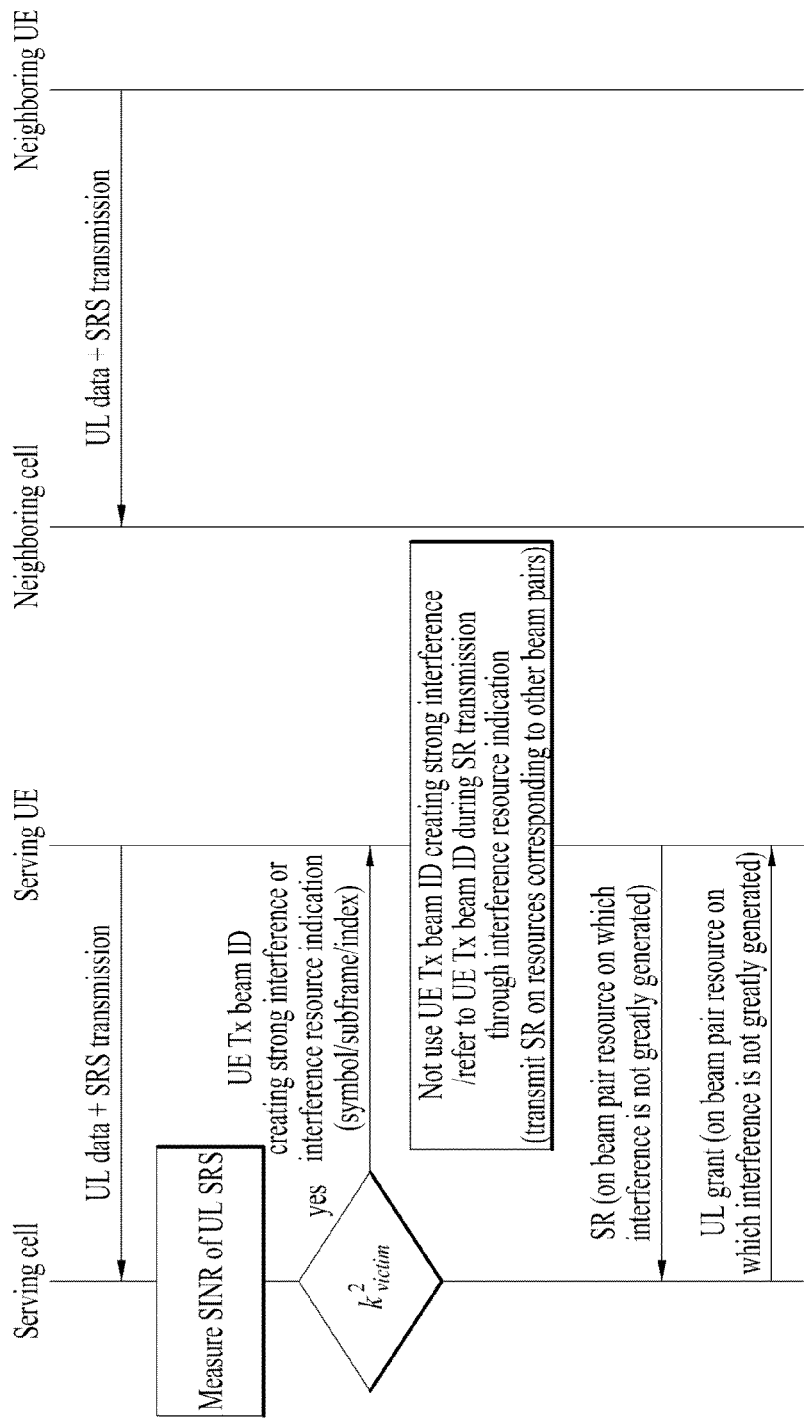
FIG. 27 is a diagram for explaining an operation for ICIC when a victim UE according to Type c-1 is UE $k_{victim}^2$.
Figure 28:
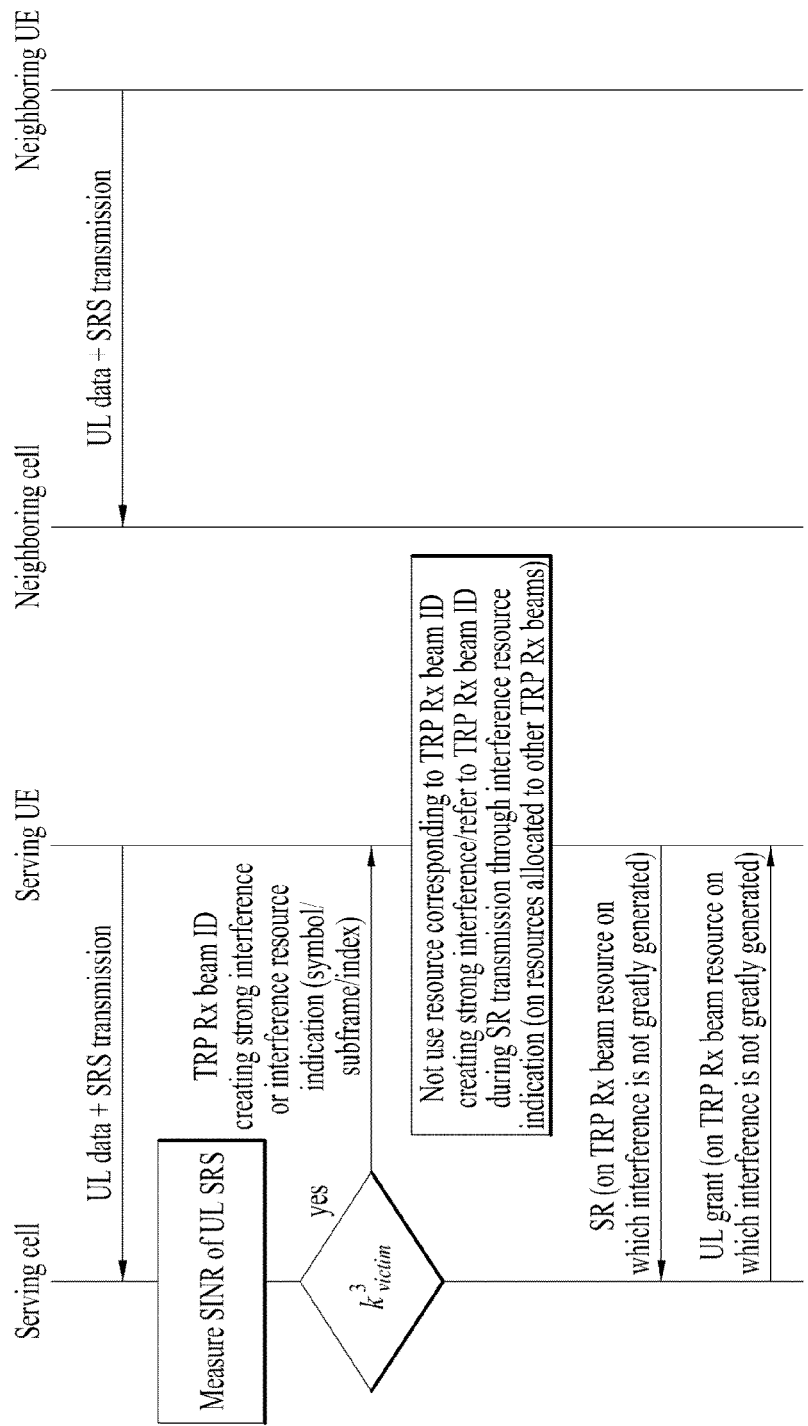
FIG. 28 is a diagram for explaining an operation for ICIC when a victim UE according to Type c-2 is UE $k_{victim}^3$.
Figure 29:
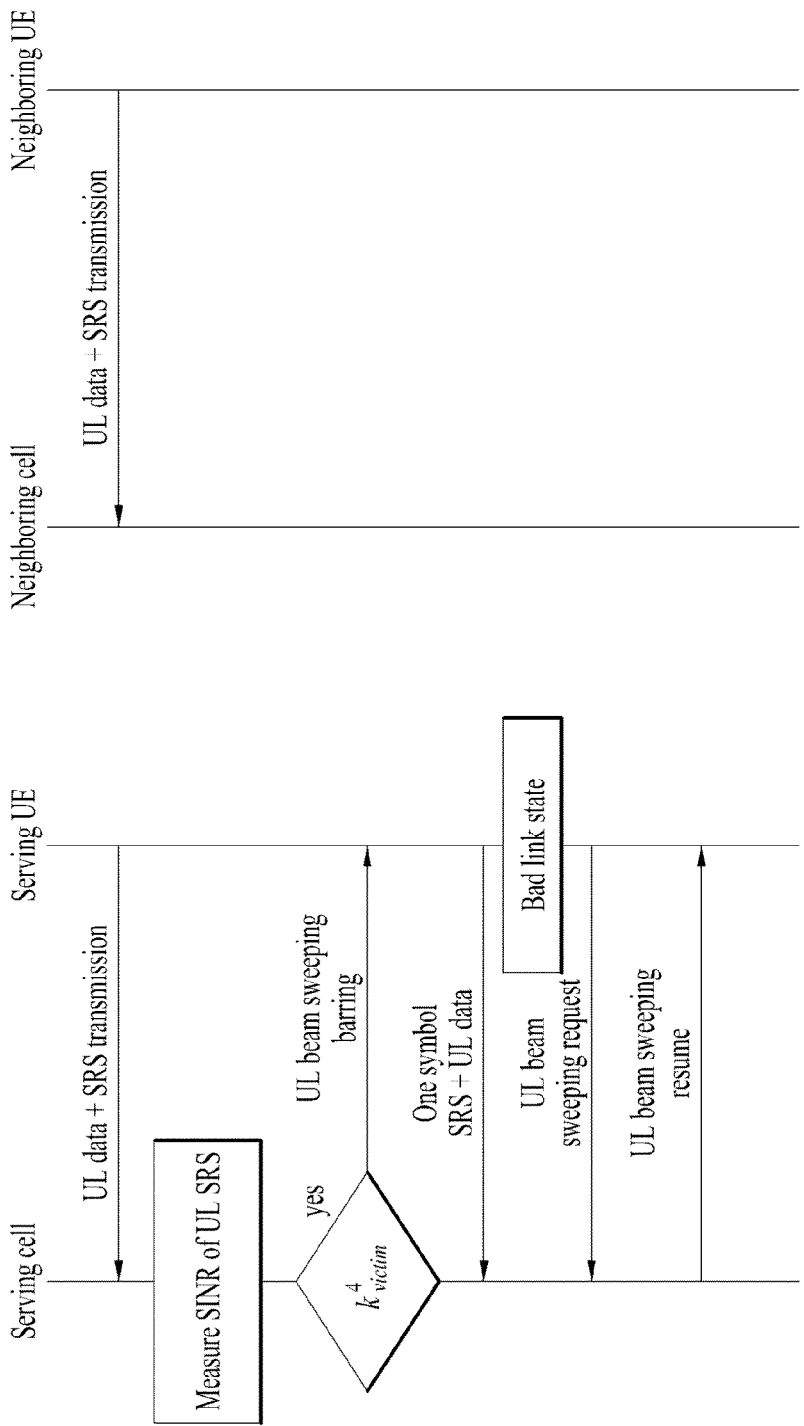
FIG. 29 is a diagram for explaining an operation for ICIC when a victim UE according to Type c-3 is UE $k_{victim}^4$.

FIG. 27 is a diagram for explaining an operation for ICIC when a victim UE according to Type c-1 is UE $k_{victim}^2$, FIG. 28 is a diagram for explaining an operation for ICIC when a victim UE according to Type c-2 is UE $k_{victim}^3$, and FIG. 29 is a diagram for explaining an operation for ICIC when a victim UE according to Type c-3 is UE $k_{victim}^4$.

Referring to FIG. 27, a serving UE within a serving cell may transmit UL data and an SRS to the serving cell and a neighboring UE within a neighboring cell may transmit UL data and the SRS to the neighboring cell. Then, the serving cell may measure an SINR in an SRS region unit corresponding to a UE Tx beam ID (e.g., one Tx beam ID). The serving cell may determine the serving UE as a victim UE (UE $k_{victim}^2$) as a result of SINR measurement. The serving cell may transmit a UE Tx beam ID creating strong interference and/or information (e.g., symbol/subframe/sub-symbol index) indicating an interference resource creating strong interference to the serving UE. The serving UE may not use a resource corresponding to the Tx beam ID creating strong interference or may transmit a scheduling request (SR) on resources corresponding to other beam pairs based on the information indicating the interference resource. The serving cell may transmit information about a resource corresponding to a beam pair in which interference is not greatly generated to the serving UE through a UL grant.

FIG. 28 is different from FIG. 27 in that the SINR is measured based on a TRP Rx beam rather than the Tx beam of the UE. That is, the eNB measures an SINR for a resource region corresponding to the same TRP Rx beam ID. Referring to FIG. 28, the serving cell measures an SINR of a UL SRS for a resource region corresponding to the same TRP Rx beam ID. The serving cell may determine the serving UE as a victim UE (UE $k_{victim}^3$) based on a result of SINR measurement. The serving cell may transmit a TRP Rx beam ID generating strong interference and/or information (e.g., symbol/sub-symbol/subframe index) indicating a resource corresponding to the TRP Rx beam ID generating strong interference to the serving UE. The serving UE may transmit the SR on a resource corresponding to a TRP Rx beam ID other than a resource corresponding to the TRP Rx beam ID generating strong interference, based on the received information. The serving cell may transmit information about a resource corresponding to a TRP Rx beam ID which does not greatly generate interference to the serving UE through a UL grant.

Referring to FIG. 29, FIG. 29 is different from FIG. 27 in that an SINR is measured with respect to a resource region for UL beam refinement in region C. The serving cell may determine the serving UE as a victim UE (UE $k_{victim}^4$) based on a result of SINR measurement. The serving cell may transmit information indicating that UL beam sweeping is barred to the serving UE. The serving UE transmits an SRS in one symbol and UL data based on the received information. If a radio link state of the serving UE is worse than a threshold, the serving UE may request UL beam sweeping to the serving cell. When the radio link state of the serving UE is not good, the serving cell may indicate that the serving UE should resume UL beam sweeping.

Figure 30:
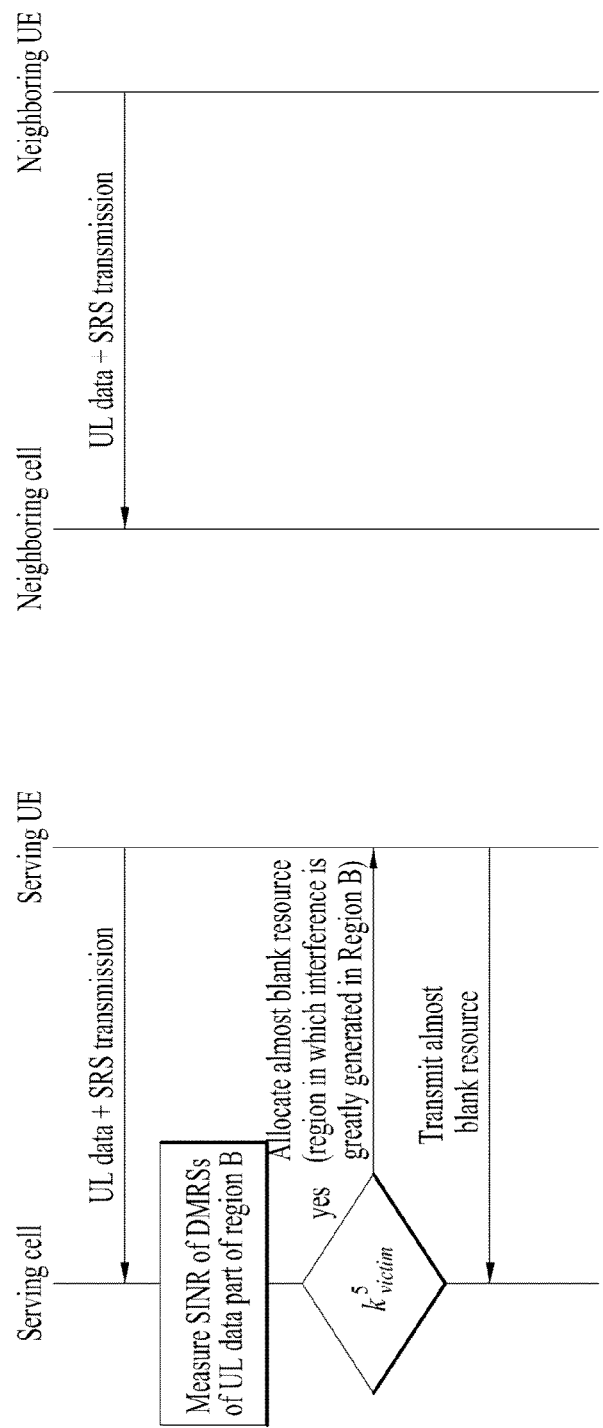
FIG. 30 is a diagram for explaining an operation for ICIC according to an interference measurement method of Type d-1/d-2.

FIG. 30 is a diagram for explaining an operation for ICIC according to an interference measurement method of Type d-1/d-2.

As described above, Type d-1/d-2 serves to perform ICIC in a UL data region to avoid interference according to UL beam sweeping. Referring to FIG. 30, the eNB may measure an SINR using DMRSs in a UL data region of region B. The serving cell may determine the serving UE as a victim UE (UE $k_{victim}^5$) as a result of SINR measurement. The serving cell may allocate a region in which interference is greatly generated in region B as an almost blank resource. Herein, a configuration of the almost blank resource will now be described with reference to FIG. 31.

Figure 31:
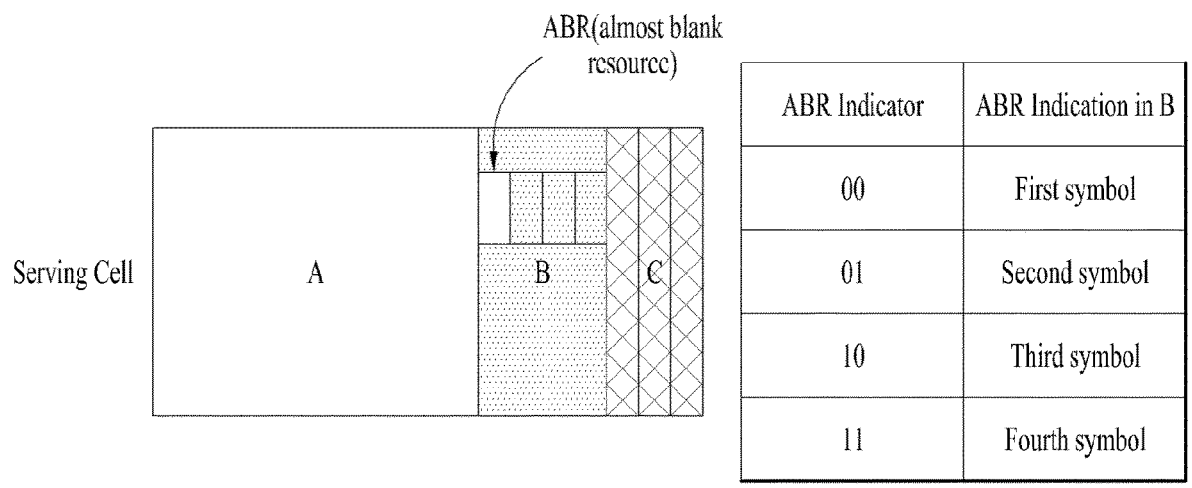
FIG. 31 is a diagram illustrating a configuration of an almost blank resource for a victim UE (UE $k_{victim}^5$) in FIG. 30.

FIG. 31 is a diagram illustrating a configuration of an almost blank resource for a victim UE (UE $k_{victim}^5$) in FIG. 30.

Referring to FIG. 31, the almost blank resource may be configured such that a serving cell indicates the almost blank resource by a bitmap or may indicate a symbol index by an indicator (e.g., an almost blank resource (ABR) indicator). The almost blank resource occurs in a subframe transmitted at the same timing as a subframe in which UL beam refinement occurs in a neighboring cell.

Figure 32:
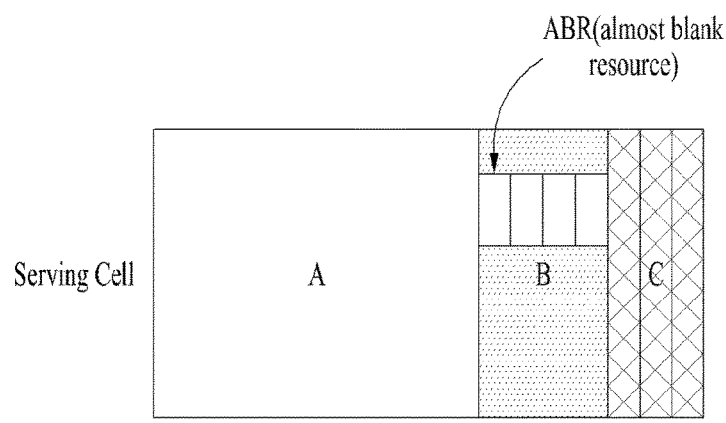
FIG. 32 is a diagram illustrating a configuration of an almost blank resource for a victim UE (UE $k_{victim}^6$).

FIG. 32 is a diagram illustrating a configuration of an almost blank resource for a victim UE (UE $k_{victim}^6$).

UE $k_{victim}^6$ may have the same ICI procedure as UE $k_{victim}^5$ but may be equal to or different from UE $k_{victim}^5$ in the size of the almost blank resource. Referring to FIG. 32, it may be appreciated that UE $k_{victim}^6$ has an almost blank resource larger than an almost blank resource of UE $k_{victim}^5$.

Figure 33:
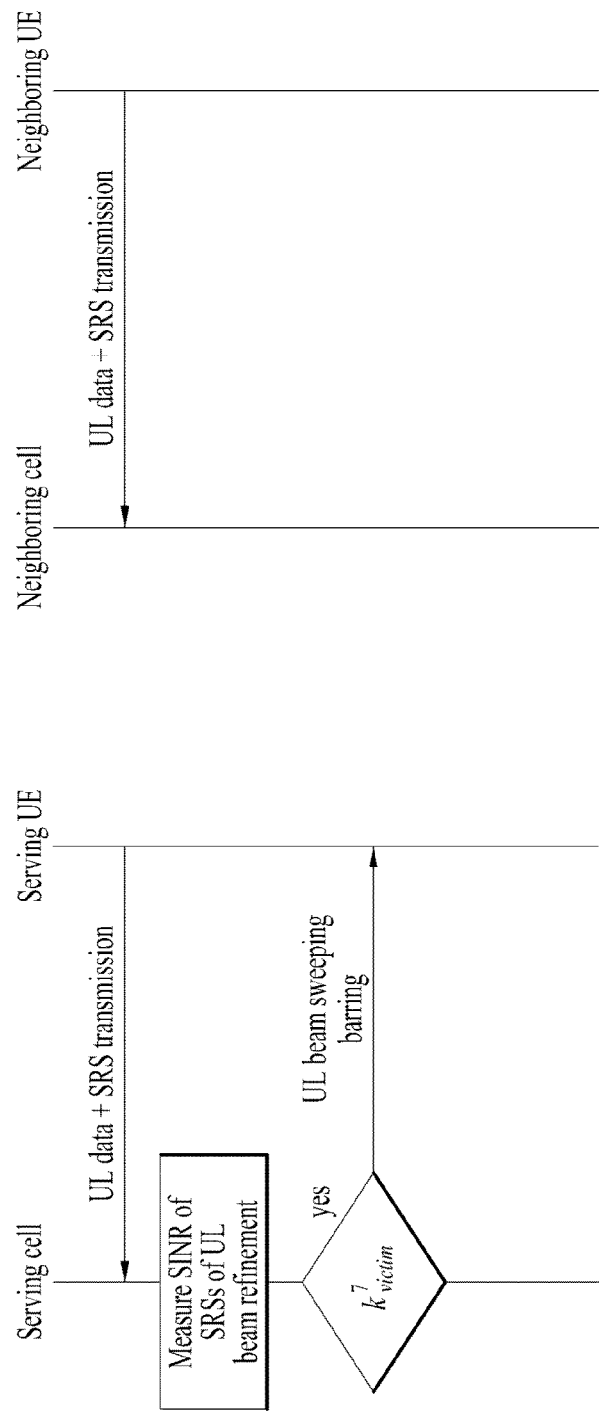
FIG. 33 is a diagram for explaining an operation for ICIC according to an interference measurement method of Type e.

FIG. 33 is a diagram for explaining an operation for ICIC according to an interference measurement method of Type e.

As an interference measurement method, Type e focuses on whether UL beam sweeping is performed. A serving cell may measure an SINR in an SRS resource region for UL beam refinement. The serving cell may determine a serving UE as a victim UE (UE $k_{victim}^7$) as a result of SINR measurement. The serving cell may transmit information indicating that UL beam sweeping is barred to the serving UE.

According to various embodiments described above, UL interference measurement and a method of specifying and determining a victim UE in an environment in which an interference variation occurs in a subband, symbol, or sub-symbol unit in New RAT are proposed so that interference of the victim UE may be efficiently managed.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of controlling ICI in a wireless communication system and an apparatus therefor is industrially applicable to various wireless communication systems such as a 3GPP LTE/LTE-A system and a 5G communication system.

The invention claimed is:

1. A method of controlling inter-cell interference by a base station (BS) in a wireless communication system, the method comprising:
receiving a demodulation reference signal (DMRS) or a sounding reference symbol (SRS) from a user equipment (UE) of a cell to which the BS belongs in a predefined physical resource region;
measuring interference on a resource on which the DMRS or the SRS is transmitted based on an interference measurement scheme corresponding to the predefined physical resource region;
when a strength of the measured interference is greater than a predetermined threshold, determining the UE as a victim UE for the predefined physical resource region,
transmitting, to the determined victim UE, a beam index creating the measured interference greater than the threshold to the UE, and
receiving, from the determined victim UE, a scheduling request through a resource corresponding to a beam index other than the beam index creating interference to the UE,
wherein the beam index creating interference to the UE includes a transmission reception point, TRP, reception, Rx, beam identifier, ID, or a UE transmission, Tx, beam ID,
wherein the predefined physical resource region is a first physical resource region for uplink data transmission of a cell to which the BS belongs, corresponding to a physical resource region for uplink beam sweeping of a neighboring cell to which a neighboring BS belongs, or a second physical resource region for the UL beam sweeping of the cell to which the BS belongs.

2. The method of claim 1, wherein the resource on which the SRS or the DMRS is transmitted includes a time duration of one symbol of the second physical resource region in a time domain and interference is measured in the time duration of the one symbol.

3. The method of claim 1, wherein the resource on which the SRS is transmitted includes a time duration corresponding to one transmission (Tx) beam identifier (ID) of the UE for transmitting the SRS in a time domain of the second physical resource region and interference is measured in the time duration corresponding to the one Tx beam ID of the UE.

4. The method of claim 1, wherein the resource on which the SRS is transmitted includes a time duration corresponding to one transmission reception point (TRP) reception (Rx) beam identifier (ID) in a time domain of the second physical resource region and interference is measured in the time duration corresponding to the TRP Rx beam.

5. The method of claim 1, wherein the resource on which the SRS is transmitted includes a time duration for uplink beam refinement of the UE in a time domain of the second physical resource region and interference is measured in the time duration for the uplink beam refinement.

6. The method of claim 1, wherein the resource on which the DMRS is transmitted is a symbol unit in a time domain of the first physical resource region and interference is measured in the symbol unit in which the DMRS is transmitted.

7. The method of claim 1, wherein the resource on which the DMRS is transmitted includes a time duration corresponding to one TRP Rx beam ID in a time domain of the first physical resource region and interference is measured in the time duration corresponding to the one TRP Rx beam ID.

8. The method of claim 1, further comprising transmitting information about an almost blank resource allocated based on the interference measurement to the determined victim UE.

9. A base station (BS) for controlling inter-cell interference in a wireless communication system, the BS comprising:
a receiver configured to receive a demodulation reference signal (DMRS) or a sounding reference symbol (SRS) from a user equipment (UE) of a cell to which the BS belongs in a predefined physical resource region; and a processor configured to measure interference on a resource on which the DMRS or the SRS is transmitted based on an interference measurement scheme corresponding to the predefined physical resource region, determine the UE as a victim UE for the predefined physical resource region when a strength of the measured interference is greater than a predetermined threshold, transmit, to the determined victim UE, a beam index creating the measured interference greater than the threshold to the UE, and receive, from the determined victim UE, a scheduling request through a resource corresponding to a beam index other than the beam index creating interference to the UE, wherein the beam index creating interference to the UE includes a transmission reception point, TRP, reception, Rx, beam identifier, ID, or a UE transmission, Tx, beam ID, wherein the predefined physical resource region is a first physical resource region for uplink data transmission of a cell to which the BS belongs, corresponding to a physical resource region for uplink beam sweeping of a neighboring cell to which a neighboring BS belongs, or a second physical resource region for the UL beam sweeping of the cell to which the BS belongs.

10. The BS of claim 9, wherein the resource on which the SRS or the DMRS is transmitted includes a time duration of one symbol of the second physical resource region in a time domain and the processor is configured to measure interference in the time duration of the one symbol.

11. The BS of claim 9, wherein the resource on which the SRS is transmitted includes a time duration corresponding to one transmission (Tx) beam identifier (ID) of the UE in a time domain of the second physical resource region and the processor is configured to measure interference in the time duration corresponding to the one Tx beam ID of the UE.

12. The BS of claim 9, wherein the resource on which the SRS is transmitted includes a time duration corresponding to one transmission reception point (TRP) reception (Rx) beam identifier (ID) in a time domain of the second physical resource region, and wherein the processor is configured to measure interference in the time duration corresponding to the TRP Rx beam.

13. The BS of claim 9, wherein the resource on which the SRS is transmitted includes a time duration for uplink beam refinement of the UE in a time domain of the second physical resource region and the processor is configured to measure interference in the time duration for the uplink beam refinement.

14. The BS of claim 9, wherein the resource on which the DMRS is transmitted is a symbol unit in a time domain of the first physical resource region and the processor is configured to measure interference in the symbol unit in which the DMRS is transmitted.

15. The BS of claim 9, wherein the resource on which the DMRS is transmitted includes a time duration corresponding to on TRP Rx beam ID in a time domain of the first physical resource region and the processor is configured to measure interference in the time duration corresponding to the one TRP Rx beam ID.

16. The BS of claim 9, further comprising a transmitter configured to transmit information about an almost blank resource allocated based on the interference measurement to the determined victim UE.

* * * * *